United States Patent
Suzuki

(10) Patent No.: US 11,671,403 B2
(45) Date of Patent: Jun. 6, 2023

(54) RELAY DEVICE, NON-TRANSITORY COMPUTER-READABLE STORAGE MEDIUM AND COMMUNICATION SYSTEM

(71) Applicant: FUJITSU LIMITED, Kawasaki (JP)

(72) Inventor: Dai Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 16/998,214

(22) Filed: Aug. 20, 2020

(65) Prior Publication Data

US 2021/0099422 A1    Apr. 1, 2021

(30) Foreign Application Priority Data

Sep. 26, 2019    (JP) .............................. JP2019-175822

(51) Int. Cl.
*H04L 9/40*    (2022.01)
*H04L 9/32*    (2006.01)
(Continued)

(52) U.S. Cl.
CPC ............ *H04L 63/02* (2013.01); *H04L 9/0825* (2013.01); *H04L 9/0894* (2013.01); *H04L 9/3226* (2013.01); *H04L 9/3247* (2013.01); *H04L 9/50* (2022.05); *H04L 63/08* (2013.01); *H04L 63/083* (2013.01); *H04L 63/0876* (2013.01);
(Continued)

(58) Field of Classification Search
None
See application file for complete search history.

(56) References Cited

U.S. PATENT DOCUMENTS 7,493,486 B1 *   2/2009   Jacobs ................ H04L 63/0428
                                                     713/153
8,291,231 B2 *   10/2012  Ueno .................... H04L 9/3263
                                                     713/168
(Continued)

FOREIGN PATENT DOCUMENTS

JP     2006-101414 A     4/2006
JP     2018-011191 A     1/2018
(Continued)

OTHER PUBLICATIONS

Machine Translation of WO2018214133 (Year: 2018).*
(Continued)

*Primary Examiner* — Luu T Pham
*Assistant Examiner* — James J Wilcox
(74) *Attorney, Agent, or Firm* — Fujitsu Patent Center

(57) ABSTRACT

A relay device includes a communicator configured to transmit and receive a message to and from the communication device, and a processor configures to acquire a public key of a communication device that is a transmission source of the message from the node and authenticates a signature included in the message with the acquired public key, wherein the processor causes, when receiving a communication message including communication data to be transmitted to a second communication device by a first communication device, the processor to perform authentication on the communication message, and the communicator transmits the communication message to the second communication device when the authentication is successful.

10 Claims, 27 Drawing Sheets

(51) Int. Cl.
  *H04L 9/00* (2022.01)
  *H04L 9/08* (2006.01)
  *H04L 67/10* (2022.01)
  *H04L 67/562* (2022.01)
  *H04W 84/04* (2009.01)

(52) U.S. Cl.
  CPC ............ *H04L 63/10* (2013.01); *H04L 63/101* (2013.01); *H04L 63/126* (2013.01); *H04L 67/10* (2013.01); *H04L 67/562* (2022.05); *H04L 63/12* (2013.01); *H04W 84/047* (2013.01)

(56) References Cited

U.S. PATENT DOCUMENTS

| | | | | |
|---|---|---|---|---|
| 9,197,418 | B2* | 11/2015 | Yao | H04L 9/083 |
| 9,224,013 | B2* | 12/2015 | Buer | G06F 21/76 |
| 9,455,994 | B1* | 9/2016 | Raman | H04L 63/145 |
| 10,284,553 | B2* | 5/2019 | Morita | H04L 63/0869 |
| 10,521,596 | B1* | 12/2019 | Paaske | H04L 9/0877 |
| 11,025,619 | B2* | 6/2021 | Sun | H04L 9/3231 |
| 2003/0093678 | A1* | 5/2003 | Bowe | H04L 9/3236 713/180 |
| 2003/0115448 | A1 | 6/2003 | Kunito et al. | |
| 2003/0115488 | A1 | 6/2003 | Kunito et al. | |
| 2006/0274748 | A1* | 12/2006 | Nakashima | H04L 49/90 370/389 |
| 2007/0011262 | A1* | 1/2007 | Kitani | H04L 63/20 709/213 |
| 2007/0136361 | A1* | 6/2007 | Lee | G06F 21/64 707/999.102 |
| 2007/0186278 | A1* | 8/2007 | Fujii | H04L 9/3263 726/5 |
| 2007/0288751 | A1* | 12/2007 | Rits | H04W 12/02 713/168 |
| 2009/0185679 | A1* | 7/2009 | Haider | G06F 21/645 380/30 |
| 2009/0210714 | A1* | 8/2009 | Haider | H04L 9/3236 380/30 |
| 2010/0250951 | A1* | 9/2010 | Ueno | H04L 9/3247 713/176 |
| 2011/0238510 | A1* | 9/2011 | Rowen | G06V 40/382 705/16 |
| 2012/0102328 | A1* | 4/2012 | Hui | H04L 63/126 709/217 |
| 2012/0189122 | A1* | 7/2012 | Huang | H04L 9/0844 380/270 |
| 2013/0223629 | A1* | 8/2013 | Huang | H04L 9/0841 380/278 |
| 2014/0032917 | A1* | 1/2014 | Morioka | H04L 9/3252 713/176 |
| 2014/0122897 | A1* | 5/2014 | Dodeja | G06F 21/57 713/189 |
| 2014/0281505 | A1* | 9/2014 | Zhang | H04L 63/126 713/158 |
| 2016/0219051 | A1* | 7/2016 | Morita | H04L 63/0869 |
| 2017/0004168 | A1* | 1/2017 | Hakala | H04L 9/007 709/217 |
| 2018/0097783 | A1 | 4/2018 | Haldenby et al. | |
| 2018/0167397 | A1* | 6/2018 | Zhang | H04L 63/126 |
| 2019/0116034 | A1 | 4/2019 | Sengupta | |
| 2019/0149338 | A1* | 5/2019 | Byrne | G06F 21/64 713/177 |
| 2019/0182031 | A1* | 6/2019 | Velissarios | H04L 9/3247 |
| 2019/0182042 | A1 | 6/2019 | Ebrahimi et al. | |
| 2019/0190724 | A1 | 6/2019 | Sundaresan et al. | |
| 2019/0208418 | A1* | 7/2019 | Breu | H04L 9/3239 |
| 2019/0268312 | A1* | 8/2019 | Ma | H04L 63/123 |
| 2019/0319808 | A1* | 10/2019 | Fallah | H04L 9/3265 |
| 2020/0051361 | A1* | 2/2020 | Cui | G07F 7/10 |
| 2020/0134209 | A1* | 4/2020 | Zhang | G06F 16/1837 |
| 2020/0328901 | A1* | 10/2020 | Moses | H04L 9/3236 |
| 2020/0387893 | A1* | 12/2020 | Maim | H04L 9/3247 |
| 2021/0092110 | A1* | 3/2021 | Messie | H04L 63/126 |
| 2021/0250174 | A1* | 8/2021 | Cheng | H04L 9/0838 |
| 2022/0141036 | A1* | 5/2022 | Jang | H04L 9/0869 713/176 |

FOREIGN PATENT DOCUMENTS

| | | | | |
|---|---|---|---|---|
| KR | 20190086815 | * | 7/2019 | .................... 713/176 |
| WO | 2017/190590 A1 | | 11/2017 | |
| WO | 2018/214133 A1 | | 11/2018 | |

OTHER PUBLICATIONS

Lau et al "Blockchain-based Authentication in IoT Networks," IEEE, pp. 1-8 (Year: 2018).*
Oulhaci et al "Secure and Distributed Certification System Architecture for Safety Message Authentication in VANET," Springer, pp. 1-16 (Year: 2017).*
KIPO Translation of Priority Document KR 10-2019-0086816, Jul. 19, 2019, pp. 1-69 (Year: 2019).*
Shell et al. "A Hybrid Blockchain Ledger for Supply Chain Visibility," 2018 17th International Symposium on Parallel and Distributed Computing, pp. 118-125 (Year: 2018).*
Kobeissi et al "Ledger Design Language: Designing and Deploying Formally Verified Public Ledgers," 2018 IEEE European Symposium on Security and Privacy Workshops, IEEE Computer Society, pp. 162-166, (Year: 2018).*
CNOA—Office Action of Chinese Patent Application No. 202010946607.4 dated Sep. 5, 2022 with English Translation.
**References cited in CNOA were previously submitted in IDS filed on Apr. 1, 2021.
EESR—Extended European Search Report dated Feb. 4, 2021 for European Patent Application No. 20191503.0.
JPOA—Office Action of Japanese Patent Application No. 2019-175822 dated Apr. 11, 2023 with Machine Translation.

* cited by examiner

FIG. 6

| DEVICE | ADDRESS | IDENTIFIER | PUBLIC KEY | SECRET KEY |
|---|---|---|---|---|
| RELAY DEVICE 200 | IP3 | xyz | - | - |
| TERMINAL DEVICE 100-1 | IP1 | abc | Pka | Ska |
| TERMINAL DEVICE 100-2 | IP2 | def | Pkd | Skd |
| NODE 300-1 | IPN1 | - | - | - |
| NODE 300-2 | IPN2 | - | - | - |
| NODE 300-3 | IPN3 | - | - | - |

| TRANSMISSION SOURCE ADDRESS | TRANSMISSION DESTINATION ADDRESS | MESSAGE TYPE | TRANSMISSION SOURCE IDENTIFIER | PUBLIC KEY |
|---|---|---|---|---|
| IP1 | IPN1 | NODE REGISTRATION REQUEST | abc | Pka |

| TRANSMISSION SOURCE ADDRESS | TRANSMISSION DESTINATION ADDRESS | MESSAGE TYPE | RELAY DEVICE IDENTIFIER | RELAY DEVICE ADDRESS |
|---|---|---|---|---|
| IPN1 | IP1 | NODE REGISTRATION RESPONSE | xyz | IP3 |

| TRANSMISSION SOURCE ADDRESS | TRANSMISSION DESTINATION ADDRESS | MESSAGE TYPE | IDENTIFIER |
|---|---|---|---|
| IP3 | IPN3 | SIGNATURE VERIFICATION REQUEST | abc |

| TRANSMISSION SOURCE ADDRESS | TRANSMISSION DESTINATION ADDRESS | MESSAGE TYPE | IDENTIFIER SEARCH RESULT | PUBLIC KEY |
|---|---|---|---|---|
| IPN3 | IP3 | SIGNATURE VERIFICATION RESPONSE | OK | Pka |

FIG. 8

| DEVICE | ADDRESS | IDENTIFIER | PUBLIC KEY |
|---|---|---|---|
| RELAY DEVICE 200 | IP3 | xyz | - |
| TERMINAL DEVICE 100-1 | - | abc | Pka |
| TERMINAL DEVICE 100-2 | - | def | Pkd |

| TRANSMISSION SOURCE ADDRESS | TRANSMISSION DESTINATION ADDRESS | TYPE | MESSAGE TYPE | TRANSMISSION SOURCE IDENTIFIER | COMMUNICATION ADDRESS | SIGNATURE |
|---|---|---|---|---|---|---|
| IP1 PORT P11 | IP3 | CONTROL | RELAY REGISTRATION REQUEST | abc | IP1 PORT P12 | SIGNATURE WITH SECRET KEY Ska |

| TRANSMISSION SOURCE ADDRESS | TRANSMISSION DESTINATION ADDRESS | TYPE | MESSAGE TYPE | TRANSMISSION SOURCE IDENTIFIER | REGISTRATION RESULT |
|---|---|---|---|---|---|
| IP3 | IP1 PORT P11 | CONTROL | RELAY REGISTRATION RESPONSE | xyz | OK |

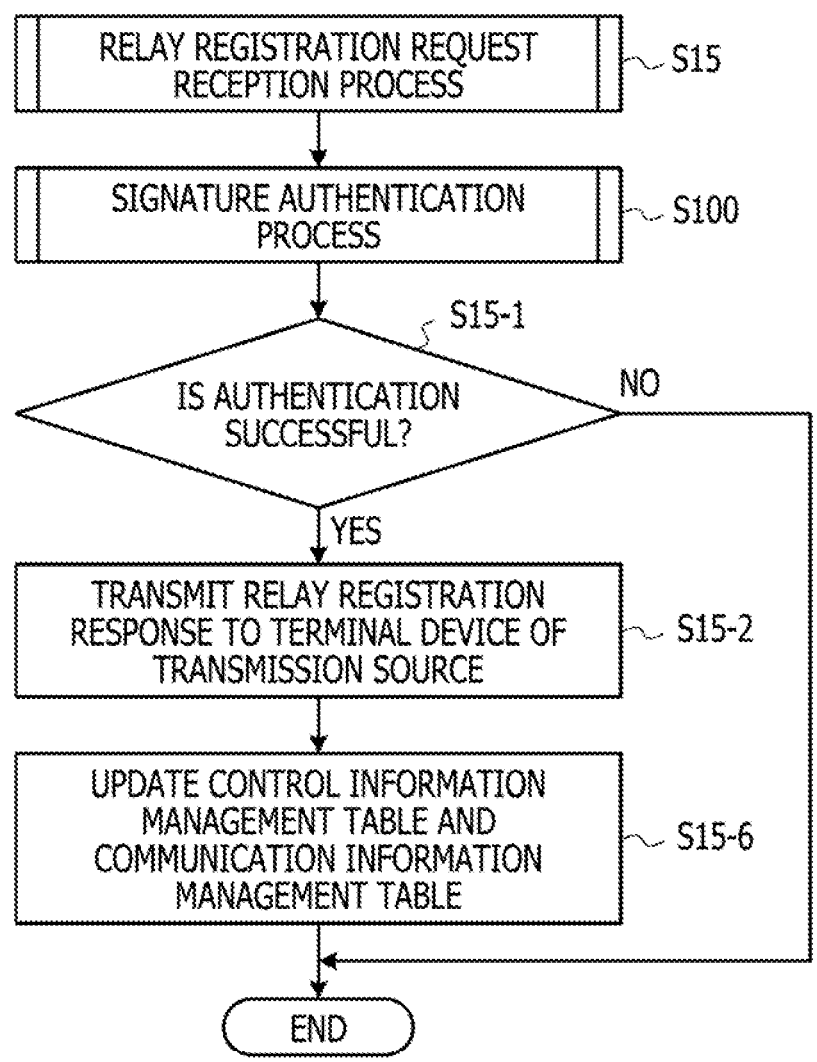

FIG. 11A

| IDENTIFIER | CONTROL ADDRESS |
|---|---|
| abc | IP1 PORT P11 |
| def | IP2 PORT P21 |

FIG. 11B

| RECEPTION-SIDE IDENTIFIER | TRANSMISSION-SIDE IDENTIFIER | RECEPTION-SIDE COMMUNICATION ADDRESS |
|---|---|---|
| abc | - | IP1 PORT 12 |
| def | - | IP2 PORT 22 |

| TRANSMISSION SOURCE ADDRESS | TRANSMISSION DESTINATION ADDRESS | TYPE | MESSAGE TYPE | TRANSMISSION SOURCE IDENTIFIER | TRANSMISSION DESTINATION IDENTIFIER | SIGNATURE |
|---|---|---|---|---|---|---|
| IP1 PORT P11 | IP3 | CONTROL | COMMUNICATION REQUEST | abc | def | SIGNATURE WITH SECRET KEY Ska |

| TRANSMISSION SOURCE ADDRESS | TRANSMISSION DESTINATION ADDRESS | TYPE | MESSAGE TYPE | TRANSMISSION SOURCE IDENTIFIER | TRANSMISSION DESTINATION IDENTIFIER | SIGNATURE |
|---|---|---|---|---|---|---|
| IP3 | IP2 PORT P21 | CONTROL | COMMUNICATION REQUEST | abc | def | SIGNATURE WITH SECRET KEY Ska |

| TRANSMISSION SOURCE ADDRESS | TRANSMISSION DESTINATION ADDRESS | TYPE | MESSAGE TYPE | TRANSMISSION SOURCE IDENTIFIER | TRANSMISSION DESTINATION IDENTIFIER | COMMUNICATION PERMISSION | SIGNATURE |
|---|---|---|---|---|---|---|---|
| IP2 PORT P21 | IP3 | CONTROL | COMMUNICATION RESPONSE | def | abc | OK | SIGNATURE WITH SECRET KEY Skd |

| TRANSMISSION SOURCE ADDRESS | TRANSMISSION DESTINATION ADDRESS | TYPE | MESSAGE TYPE | TRANSMISSION SOURCE IDENTIFIER | TRANSMISSION DESTINATION IDENTIFIER | COMMUNICATION PERMISSION | SIGNATURE |
|---|---|---|---|---|---|---|---|
| IP3 | IP1 PORT P11 | CONTROL | COMMUNICATION RESPONSE | def | abc | OK | SIGNATURE WITH SECRET KEY Skd |

FIG. 16A

| RECEPTION-SIDE IDENTIFIER | TRANSMISSION-SIDE IDENTIFIER | RECEPTION-SIDE COMMUNICATION ADDRESS |
|---|---|---|
| abc | def | IP1 PORT 12 |
| def | - | IP2 PORT 22 |

FIG. 16B

| RECEPTION-SIDE IDENTIFIER | TRANSMISSION-SIDE IDENTIFIER | RECEPTION-SIDE COMMUNICATION ADDRESS |
|---|---|---|
| abc | def | IP1 PORT 12 |
| def | abc | IP2 PORT 22 |

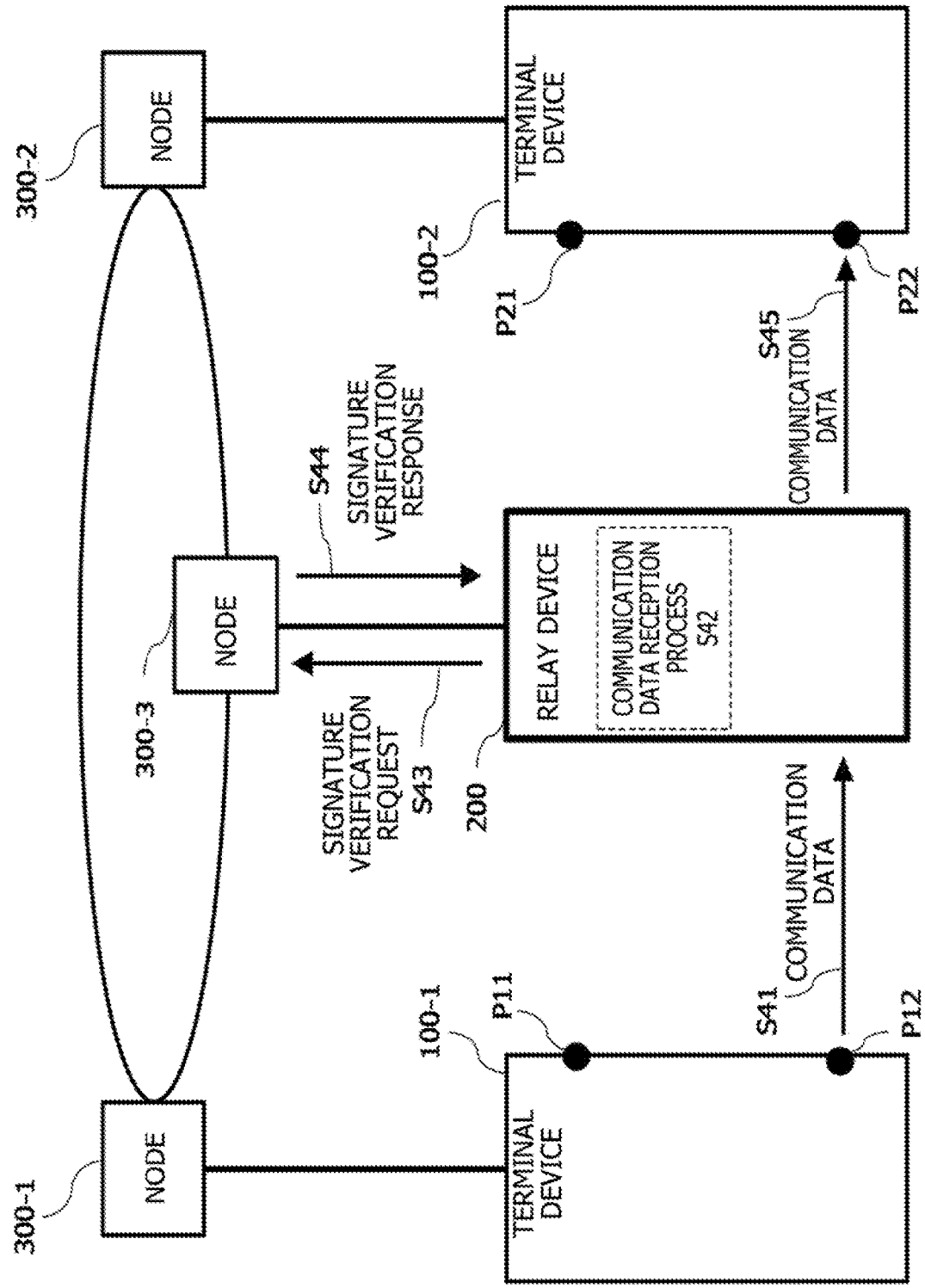

| TRANSMISSION SOURCE ADDRESS | TRANSMISSION DESTINATION ADDRESS | TYPE | MESSAGE TYPE | TRANSMISSION SOURCE IDENTIFIER | TRANSMISSION DESTINATION IDENTIFIER | PAYLOAD | SIGNATURE |
|---|---|---|---|---|---|---|---|
| IP1 PORT P12 | IP3 | COMMUNICATION | COMMUNICATION DATA | abc | def | DATA | SIGNATURE WITH SECRET KEY Ska |

| TRANSMISSION SOURCE ADDRESS | TRANSMISSION DESTINATION ADDRESS | TYPE | MESSAGE TYPE | TRANSMISSION SOURCE IDENTIFIER | TRANSMISSION DESTINATION IDENTIFIER | PAYLOAD | SIGNATURE |
|---|---|---|---|---|---|---|---|
| IP3 | IP2 PORT 22 | COMMUNICATION | COMMUNICATION DATA | abc | def | DATA | SIGNATURE WITH SECRET KEY Ska |

| TRANSMISSION SOURCE ADDRESS | TRANSMISSION DESTINATION ADDRESS | TYPE | MESSAGE TYPE | TRANSMISSION SOURCE IDENTIFIER | TRANSMISSION DESTINATION IDENTIFIER | COMMUNICATION PERMISSION | SIGNATURE |
|---|---|---|---|---|---|---|---|
| IP2 PORT P21 | IP3 | CONTROL | COMMUNICATION RESPONSE | def | abc | NG | SIGNATURE WITH SECRET KEY Skd |

| TRANSMISSION SOURCE ADDRESS | TRANSMISSION DESTINATION ADDRESS | TYPE | MESSAGE TYPE | TRANSMISSION SOURCE IDENTIFIER | TRANSMISSION DESTINATION IDENTIFIER | COMMUNICATION PERMISSION | SIGNATURE |
|---|---|---|---|---|---|---|---|
| IP3 | IP1 PORT P11 | CONTROL | COMMUNICATION RESPONSE | def | abc | NG | SIGNATURE WITH SECRET KEY Skd |

FIG. 23A

| TRANSMISSION SOURCE ADDRESS | TRANSMISSION DESTINATION ADDRESS | TYPE | MESSAGE TYPE | TRANSMISSION SOURCE IDENTIFIER | TRANSMISSION DESTINATION IDENTIFIER | SIGNATURE |
|---|---|---|---|---|---|---|
| IP1 PORT P11 | IP3 | CONTROL | COMMUNICATION REJECTION | abc | def | SIGNATURE WITH SECRET KEY Ska |

| TRANSMISSION SOURCE ADDRESS | TRANSMISSION DESTINATION ADDRESS | TYPE | MESSAGE TYPE | TRANSMISSION SOURCE IDENTIFIER | TRANSMISSION DESTINATION IDENTIFIER | SIGNATURE |
|---|---|---|---|---|---|---|
| IP3 | IP2 PORT P21 | CONTROL | COMMUNICATION REJECTION | abc | def | SIGNATURE WITH SECRET KEY Ska |

| RECEPTION-SIDE IDENTIFIER | TRANSMISSION-SIDE IDENTIFIER | RECEPTION-SIDE COMMUNICATION ADDRESS |
|---|---|---|
| abc | def | IP1 PORT 12 |
| def | - | IP2 PORT 22 |

FIG. 25B

| RECEPTION-SIDE IDENTIFIER | TRANSMISSION-SIDE IDENTIFIER | RECEPTION-SIDE COMMUNICATION ADDRESS |
|---|---|---|
| abc | - | IP1 PORT 12 |
| def | - | IP2 PORT 22 |

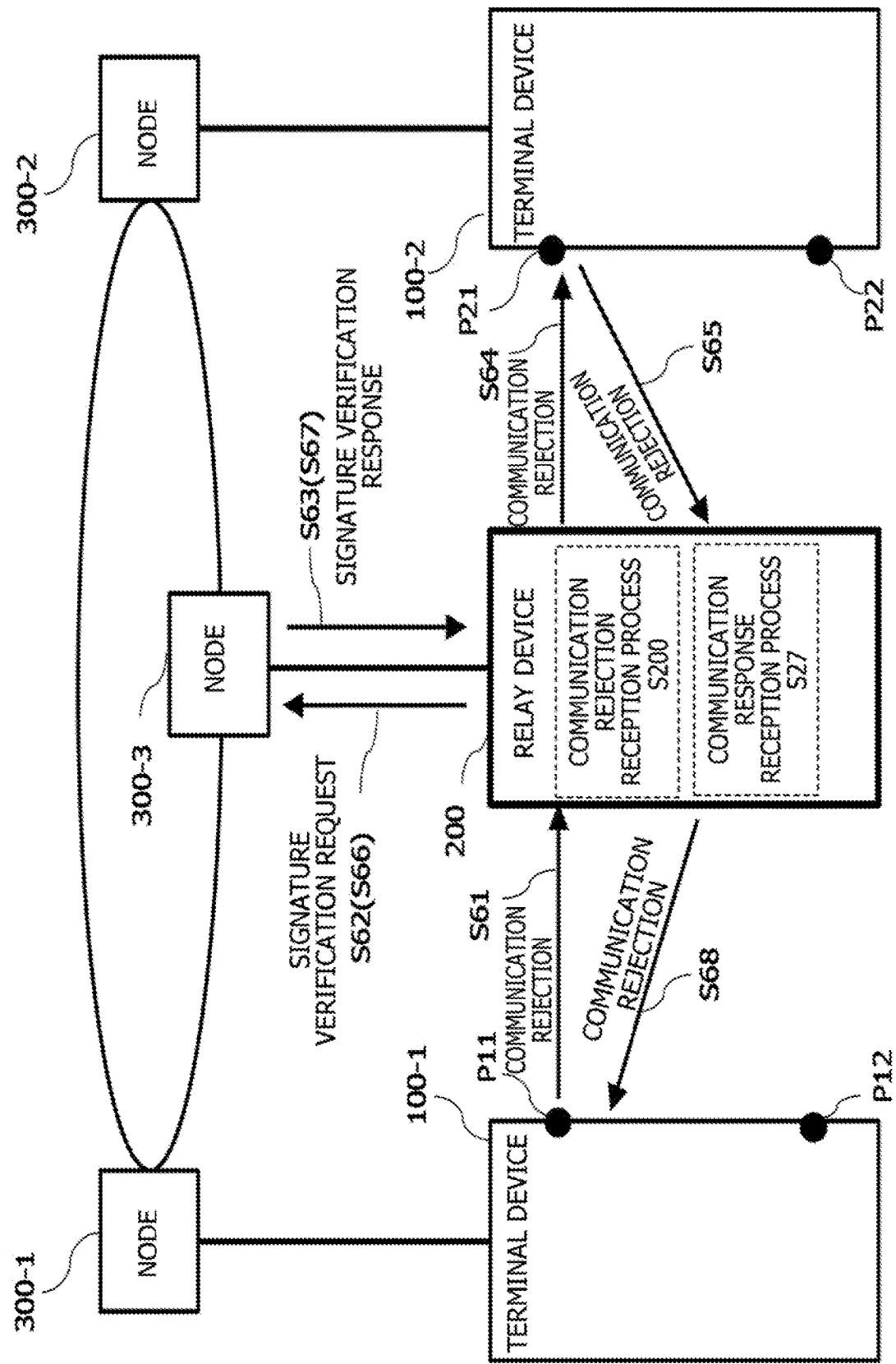

FIG. 27A

| RECEPTION-SIDE IDENTIFIER | TRANSMISSION-SIDE IDENTIFIER | RECEPTION-SIDE COMMUNICATION ADDRESS |
|---|---|---|
| abc | def | IP1 PORT 12 |
| def | abc | IP2 PORT 22 |

FIG. 27B

| RECEPTION-SIDE IDENTIFIER | TRANSMISSION-SIDE IDENTIFIER | RECEPTION-SIDE COMMUNICATION ADDRESS |
|---|---|---|
| abc | - | IP1 PORT 12 |
| def | abc | IP2 PORT 22 |

FIG. 27C

| RECEPTION-SIDE IDENTIFIER | TRANSMISSION-SIDE IDENTIFIER | RECEPTION-SIDE COMMUNICATION ADDRESS |
|---|---|---|
| abc | - | IP1 PORT 12 |
| def | - | IP2 PORT 22 |

RELAY DEVICE, NON-TRANSITORY COMPUTER-READABLE STORAGE MEDIUM AND COMMUNICATION SYSTEM

CROSS-REFERENCE TO RELATED APPLICATION

This application is based upon and claims the benefit of priority of the prior Japanese Patent Application No. 2019-175822, filed on Sep. 26, 2019, the entire contents of which are incorporated herein by reference.

FIELD

The embodiments discussed herein are related to a relay device, A non-transitory computer-readable storage medium and a communication system.

BACKGROUND

In recent years, distributed ledger technology that has appeared as a basis for realizing virtual currency has been attracting attention. A communication system in the distributed ledger technology includes a plurality of nodes having a distributed ledger function and a plurality of communication devices coupled to the nodes. The distributed ledger stores an identifier of a user, a public key, network address information of a communication device, and the like.

When a communication device is added to a network under the control of the own device, a node acquires a network address and a public key of the communication device and updates the distributed ledger. The node also notifies other nodes to add the information of the communication device to the distributed ledger. Thus, the nodes may share the distributed ledger having the same content.

The communication device acquires the network address of a partner device from the node and transmits and receives messages. The communication device acquires a public key from a node, and performs a signature on a transmission message and signature verification on a reception message. Thus, the communication device may perform secure communication.

Techniques related to the distributed ledger are disclosed in, for example, Japanese Laid-open Patent Publication Nos. 2018-11191 and 2006-101414.

SUMMARY

According to an aspect of the embodiments, a relay device in a communication system including an identifier of a communication device, a plurality of nodes having a distributed ledger function of storing a public key used for communication by the communication device in a distributed ledger to share the distributed ledger, the communication device coupled to any one of the nodes, and the relay device coupled to any one of the nodes, the relay device comprising: a communicator configured to transmit and receive a message to and from the communication device; and a processor configured to acquire a public key of a communication device that is a transmission source of the message from the node and authenticates a signature included in the message with the acquired public key; wherein the processor causes, when receiving a communication message including communication data to be transmitted to a second communication device by a first communication device, the processor to perform authentication on the communication message, and the communicator transmits the communication message to the second communication device when the authentication is successful.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of information of each device included in the communication system 10;

FIG. 7A is diagram illustrating an example of messages transmitted and received between the node 300 and the terminal device 100;

FIG. 7B is diagram illustrating an example of messages transmitted and received between the node 300 and the terminal device 100;

FIG. 7C is diagram illustrating an example of messages trans ted and received between the node 300 and the relay device 200;

FIG. 7D is diagrams illustrating an example of messages transmitted and received between the node 300 and the relay device 200;

FIG. 8 is a diagram illustrating an example of a distributed ledger;

FIG. 9A is diagrams illustrating an example of a message between the terminal device 100 and the relay device 200;

FIG. 9B includes diagrams illustrating an example of a message between the terminal device 100 and the relay device 200;

FIG. 10 is a diagram illustrating an example of a processing flowchart of a relay registration request reception process S15;

FIG. 11A is diagram illustrating an example of a control information management table;

FIG. 11B is diagram illustrating an example of a communication information management table;

FIG. 14A is diagram illustrating an example of messages transmitted and received between the terminal device 100 and the relay device 200;

FIG. 14B is diagram illustrating an example of messages transmitted and received between the terminal device 100 and the relay device 200;

FIG. 14C is diagram illustrating an example of messages transmitted and received between the terminal device 100 and the relay device 200;

FIG. 14D is diagram illustrating an example of messages transmitted and received between the terminal device 100 and the relay device 200;

FIG. 16A is diagram illustrating an example of a communication information management table;

FIG. 16B is diagram illustrating an example of a communication information management table;

FIG. 18 is a diagram illustrating an example of a sequence of a communication process;

FIG. 19A is diagram illustrating an example of messages transmitted and received between the terminal device 100 and the relay device 200;

FIG. 19B includes diagrams illustrating an example of messages transmitted and received between the terminal device 100 and the relay device 200;

FIG. 22A is diagram illustrating an example of messages transmitted and received between the terminal device 100 and the relay device 200;

FIG. 22B is diagram illustrating an example of messages transmitted and received between the terminal device 100 and the relay device 200;

FIG. 23A is diagram illustrating an example of messages transmitted and received between the terminal device 100 and the relay device 200;

FIG. 23B is diagram illustrating an example of messages transmitted and received between the terminal device 100 and the relay device 200;

FIG. 25A is diagram illustrating an example of a communication information management table;

FIG. 25B includes diagrams illustrating an example of a communication information management table;

FIG. 26 is a diagram illustrating an example of a sequence when a terminal device 100-1 transmits a communication rejection during communication;

FIG. 27A is diagram illustrating an example of the communication information management table;

FIG. 27B is diagram illustrating an example of the communication information management table; and FIG. 27C is diagram illustrating an example of the communication information management table.

DESCRIPTION OF EMBODIMENTS

First Embodiment

A first embodiment will be described.

<Configuration Example of Communication System>

Figure 1:
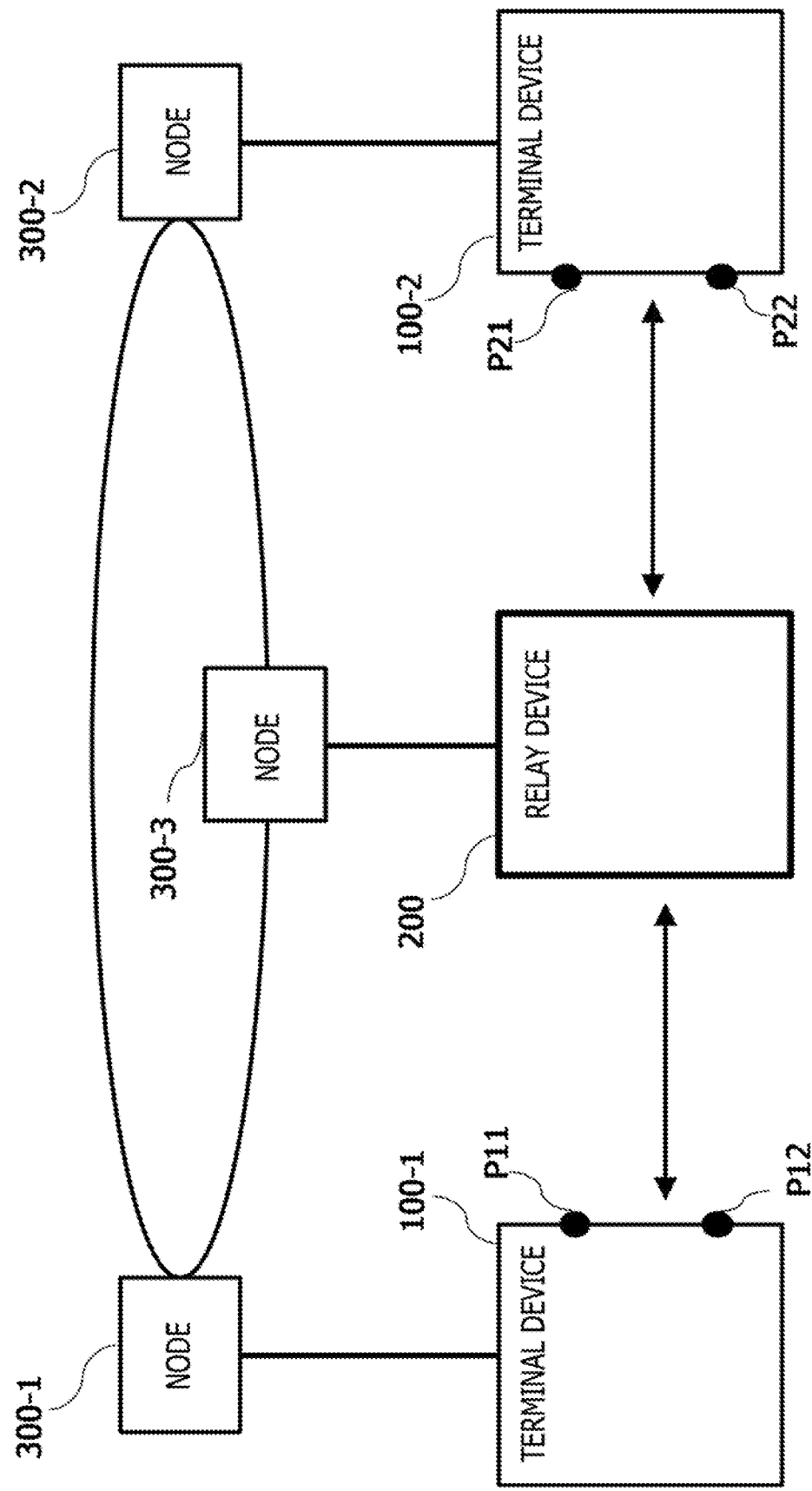
FIG. 1 is a diagram illustrating a configuration example of a communication system 10.

FIG. 1 is a diagram illustrating a configuration example of a communication system 10. Terminal devices 100-1 and 100-2 (hereinafter, may be referred to as terminal devices 100), a relay device 200, and nodes 300-1 to 300-3 (hereinafter, referred to as nodes 300) are included. The communication system 10 is a communication system having a distributed ledger function in which the nodes 300 manage a distributed ledger. The devices in the communication system 10 are coupled via a network. The node 300-1 is a node coupled to the terminal device 100-1 and corresponds to the terminal device 100-1. In other words, for example, the terminal device 100-1 is coupled to the network under the control of the node 300-1. Similarly, the node 300-2 is coupled to the terminal device 100-2, and the node 300-3 is coupled to the relay device 200. The terminal device 100 and the relay device 200 may request the node 300 coupled thereto to register in the distributed ledger or to acquire information related to a communication partner terminal device.

The terminal devices 100-1 and 100-2 (hereinafter, may be referred to as the terminal devices 100) are communication devices used for communication by users of the communication system 10, and are, for example, a computer or a tablet terminal. The terminal device 100 communicates with another terminal device 100. The terminal devices 100-1 and 100-2 include communication ports P11, P12 and communication ports P21, P22, respectively. The communication port P11 of the terminal device 100-1 is a control port. The control port is a communication port used for transmission and reception of a control message between terminal devices or with the relay device 200. The control message will be described later. The communication port P12 of the terminal device 100-1 is a communication port. The communication port is a communication port used for transmission and reception of communication data in communication between terminal devices or with another terminal device 100 via the relay device 200. The communication port will be described later. Similarly, the communication port P21 of the terminal device 100-2 is a control port, and the communication port P22 is a communication port.

The relay device 200 is a communication device that relays communication between terminal devices. Upon receiving the control message from the terminal device 100, and when the security of the received message is confirmed, the relay device 200 transmits the received control message to the terminal device 100 of the transmission destination. For example, the relay device 200 verifies a signature of the received control message with a public key to confirm the security of the received control message.

Upon receiving a communication message from the terminal device 100, the relay device 200 confirms that communication with the terminal device 100 of the transmission destination is permitted, in addition to confirming security at the time of receiving the control message, and transmits the received communication message to the terminal device 100 of the transmission destination. The relay device 200 confirms whether or not communication with the terminal device 100 of the transmission destination is permitted by managing the communication state between the terminal devices.

The nodes 300-1 to 300-3 (hereinafter, may be referred to as nodes 300) are devices that have distributed ledgers and perform a distributed ledger process between the nodes 300. The distributed ledger is a table that stores, for example, identifiers of the terminal devices 100 (or users of the terminal devices 100) and the relay device 200 (or administrators or users of the relay device 200) coupled to the network, public keys used by the terminal devices 100 for communication, and network address (for example, IP address) of the relay device 200. The node 300 performs distributed ledger process in order to maintain a distributed ledger having the same content as that of other nodes 300. The distributed ledger process is, for example, a process of transmitting, at a timing when a certain node 300 updates the distributed ledger, updated information to other nodes 300, and instructing update of the distributed ledger. The distributed ledger process may include a process of periodically or aperiodically confirming the content of the distributed ledgers between the nodes in order to confirm that the distributed ledger held by each node 300 stores the same content as that of the distributed ledgers held by other nodes 300.

In the communication system 10, the node 300 performs the distributed ledger process and shares a distributed ledger. The relay device 200 acquires the network address and the public key of the terminal device 100 from the corresponding (coupled) node 300, and authenticates the signature of the received message. The terminal device 100 communicates with another terminal device 100 via the relay device 200, thereby capable of receiving a message with high security that has been subjected to signature authentication by the relay device 200.

In the communication system 10 in FIG. 1, the number of the terminal devices 100 is two, but may be three or more. In the communication system 10 in FIG. 1, one terminal device 100 or relay device 200 is coupled to each node 300, but a plurality of devices may be coupled. In the communication system 10 in FIG. 1, the number of the nodes 300 is three, but may be one or two, or may be four or more when there are more terminal devices 100 and relay devices 200 than the case illustrated in FIG. 1.

<Configuration Example of Relay Device>

Figure 2:
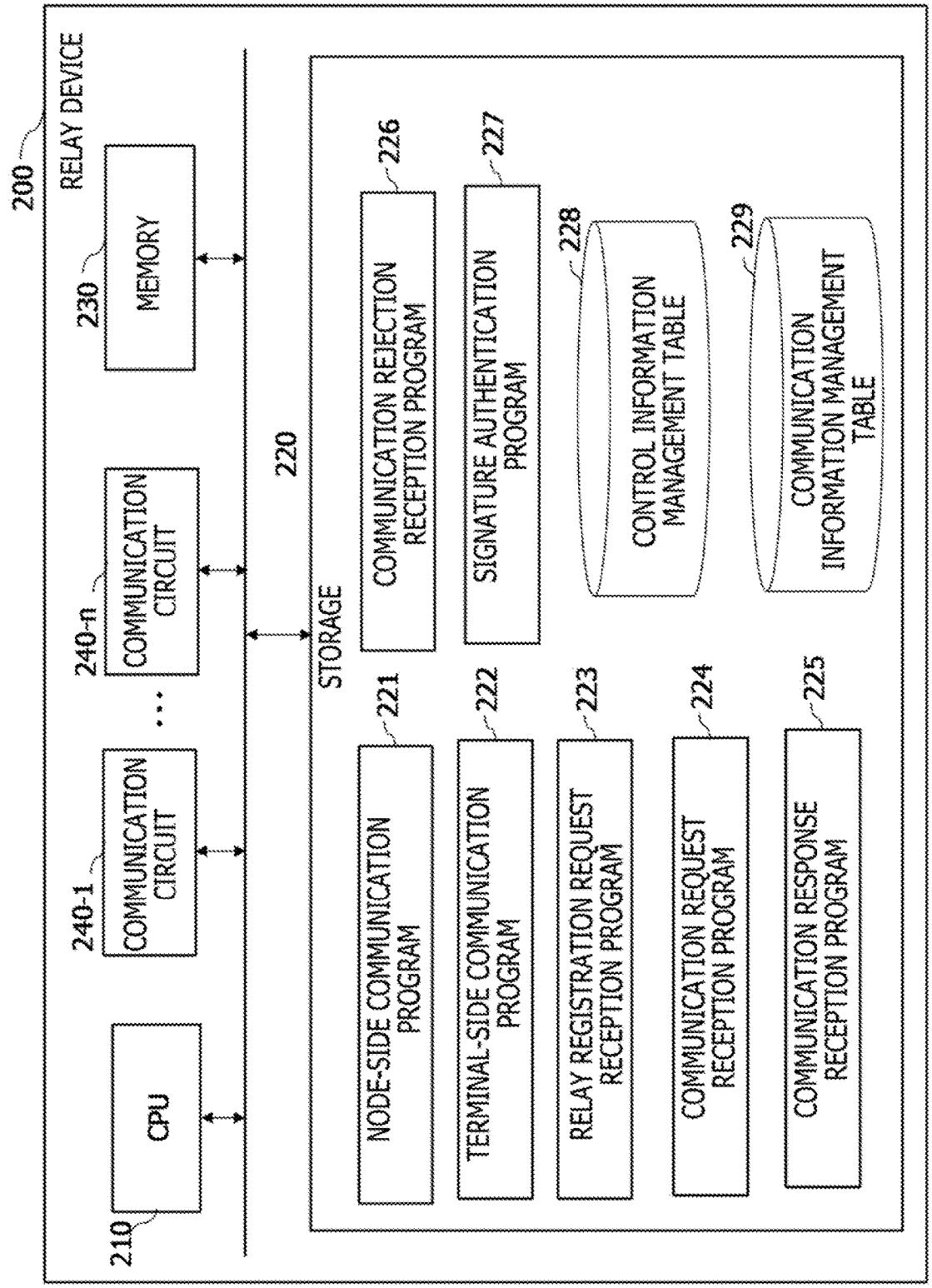
FIG. 2 is a diagram illustrating a configuration example of a relay device 200.

FIG. 2 is a diagram illustrating a configuration example of the relay device 200. The relay device 200 is, for example, a computer or a server machine.

The relay device 200 includes a central processing unit (CPU) 210, a storage 220, a memory 230, and communication circuits 240-1 to 240-n (n is an integer of two or more).

The storage 220 is an auxiliary storage device, such as a flash memory, a hard disk drive (HDD), a solid state drive (SSD), or the like for storing programs and data. The storage 220 stores a node-side communication program 221, a terminal-side communication program 222, a relay registration request reception program 223, a communication request reception program 224, a communication response reception program 225, a communication rejection reception program 226, a signature authentication program 227, a control information management table 228, and a communication information management table 229. The table may be stored in the memory 230.

The control information management table 228 is a table in which the relay device 200 manages the terminal device 100 that participates in (coupled to) the communication system 10. When the terminal device 100 participates in the communication system 10 and communicates with another terminal device 100, it is demanded that the identifier of the own device (or the user of the own device), the network address used for communication, and the like are registered in the control information management table 228.

The communication information management table 229 is a table in which the relay device 200 manages the communication state of the terminal device 100. In the communication information management table 229, the relay device 200 stores which terminal device 100 allows (permits) reception of a communication message from which terminal device 100.

The memory 230 is an area in which a program stored in the storage 220 is loaded. The memory 230 may also be used as an area in which a program stores data.

The communication circuits 240-1 to 240-n (hereinafter, may be referred to as communication circuits 240) are interfaces coupled to a network. The communication circuits 240 correspond to wireless or wired communication. The communication circuit 240 is, for example, an interface device having a communication port for coupling to the Internet, such as a network interface card. The relay device 200 communicates with the node 300-3 and the terminal device 100 via the communication circuit 240.

The CPU 210 is a processor that loads a program stored in the storage 220 into the memory 230, executes the loaded program, constructs each unit, and implements each process.

By executing the node-side communication program 221, the CPU 210 constructs a node-side transmission/reception unit and performs a node-side communication process. A node-side communication process is a process of transmitting or receiving a message to or from the coupled node 300.

By executing the terminal-side communication program 222, the CPU 210 constructs a transmission/reception unit and performs a terminal-side communication process. A terminal-side communication process is a process of transmitting or receiving a message to or from the terminal device 100.

By executing the relay registration request reception program 223, the CPU 210 constructs a registration unit and performs a relay registration request reception process. The relay registration request reception process is a process performed when a relay registration request is received from the terminal device 100. In the relay registration request reception process, the relay device 200 authenticates the signature of the received message, and stores (registers) the identifier of the terminal device 100 (or the user of the terminal device 100), the network address and the communication port number used by the terminal device 100 for communication with another terminal device 100, and the like in the control information management table 228.

By executing the communication request reception program 224, the CPU 210 constructs a request receiving unit and performs a communication request reception process. The communication request reception process is a process performed when a communication request is received from the terminal device 100. In the communication request reception process, the relay device 200 authenticates the signature of the received message and transmits the received communication request to the terminal device 100 that is the transmission destination of the communication request.

By executing the communication response reception program 225, the CPU 210 constructs a response reception unit and performs a communication response reception process. The communication response reception process is a process performed when a communication response, which is a response message of a communication request, is received from the terminal device 100. In the communication response reception process, the relay device 200 authenticates the signature of the received message and transmits the received communication response to the terminal device 100 that is the transmission source of the communication request.

By executing the communication rejection reception program 226, the CPU 210 constructs a rejection reception unit and performs a communication rejection reception process. The communication rejection reception process is a process performed when a communication rejection for rejecting reception of a communication message including subsequent communication data is received from the terminal device 100. In the communication rejection reception process, the relay device 200 authenticates the signature of the received message and transmits the received communication rejection to the terminal device 100 that is the transmission destination of the communication rejection.

By executing the signature authentication program 227, the CPU 210 constructs an authentication unit and performs a signature authentication process. The signature authentication process is a process of authenticating a message received from the terminal device 100 using a signature included in the message. In the signature authentication process, the relay device 200 acquires the public key of the transmission source terminal device 100 from the node 300 and authenticates the signature included in the message, <Configuration Example of Terminal Device>

Figure 3:
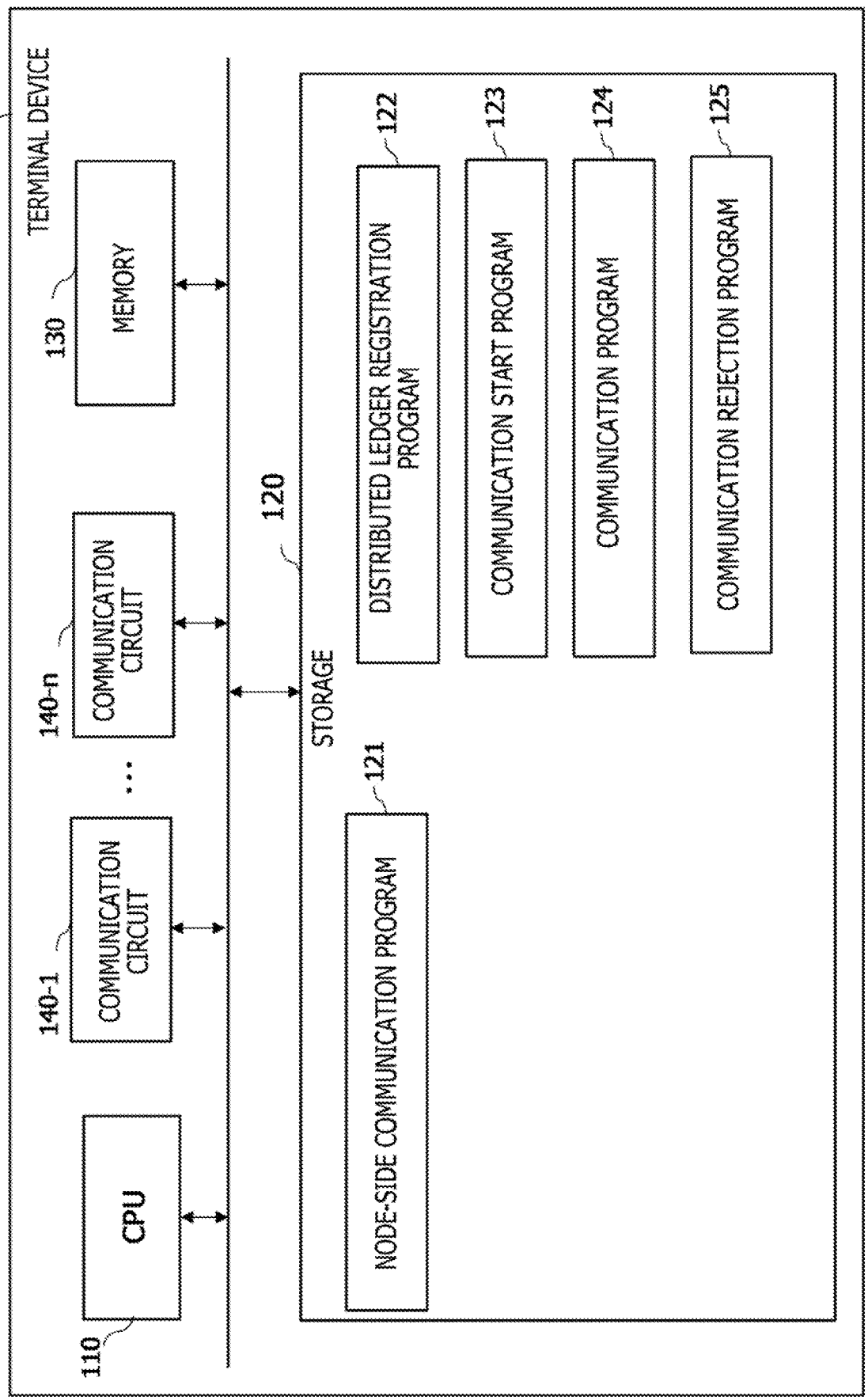
FIG. 3 is a diagram illustrating a configuration example of a terminal device 100.

FIG. 3 is a diagram illustrating a configuration example of the terminal device 100. The terminal device 100 is a communication device used when a user performs communication, and is, for example, a computer or a tablet terminal.

The terminal device 100 includes a CPU 110, a storage 120, a memory 130, and communication circuits 140-1 to 140-n.

The storage 120 is an auxiliary storage device, such as a flash memory, an HDD, or an SSD, for storing programs and data. The storage 120 stores a node-side communication program 121, a distributed ledger registration program 122, a communication start program 123, a communication program 124, and a communication rejection program 125.

The memory 130 is an area in which a program stored in the storage 120 is loaded. The memory 130 may also be used as an area in which a program stores data.

The communication circuits 140-1 to 14-n (hereinafter, may be referred to as communication circuits 140) are interfaces coupled to a network. The communication circuit 140 is, for example, an interface device such as a network interface card having a communication port for coupling to the Internet. The communication circuit 140 may be, for example, a wireless communication circuit that includes an antenna and performs wireless coupling. For example, the terminal device 100 may use the communication circuit 140-1 as a control port and the communication circuit 140-2 as a communication port. The terminal device 100 communicates with another terminal device 100, the relay device 200, and the node 300 via the communication circuit 140.

The CPU 110 is a processor that loads a program stored in the storage 120 into the memory 130, executes the loaded program, constructs each unit, and implements each process.

By executing the node-side communication program 221, the CPU 110 constructs a node-side transmission/reception unit and performs a node-side communication process. A node-side communication process is a process of transmitting or receiving a message to or from the coupled node 300.

By executing the distributed ledger registration program 122, the CPU 110 constructs a node registration unit and performs a distributed ledger registration process. The distributed ledger registration process is a process of registering the terminal device 100 in the distributed ledger of the node 300, for example, when the terminal device 100 participates in the communication system 10, when the terminal device 100 is coupled or recoupled, or the like. In the distributed ledger registration process, the terminal device 100 requests the node 300 to register the terminal device 100 in the distributed ledger. At the time of the request, the terminal device 100 notifies the node 300 of the public key of the own device, the identifier of the own device (or the user), and the like. When the completion of the registration in the distributed ledger is notified from the node 300, the own device is registered in the relay device 200.

By executing the communication start program 123, the CPU 110 constructs a communication start unit and performs a communication start process. The communication start process is a process that is performed when the terminal device 100 starts communication with another communication system in a state in which the own device is registered in the relay device 200. In the communication start process, the terminal device 100 transmits a communication request to the relay device 200 and waits for a response (communication response) from the partner terminal device 100. Upon receiving the communication response from the partner terminal device 100, the terminal device 100 is in a communication state.

By executing the communication program 124, the CPU 110 constructs a communication unit and performs a communication process. The communication process is a process in which the terminal device 100 transmits or receives a communication message to or from another terminal device 100 via the relay device 200 in the communication state.

By executing the communication rejection program 125, the CPU 110 constructs a communication rejection unit and performs a communication rejection process. The communication rejection process is a processing of notifying another terminal device 100 that the communication message is not received. For example, when terminating the communication, the terminal device 100 transmits a communication rejection to the other terminal device 100 via the relay device 200, and notifies that the communication will not be performed thereafter, <Configuration Example of Node>

Figure 4:
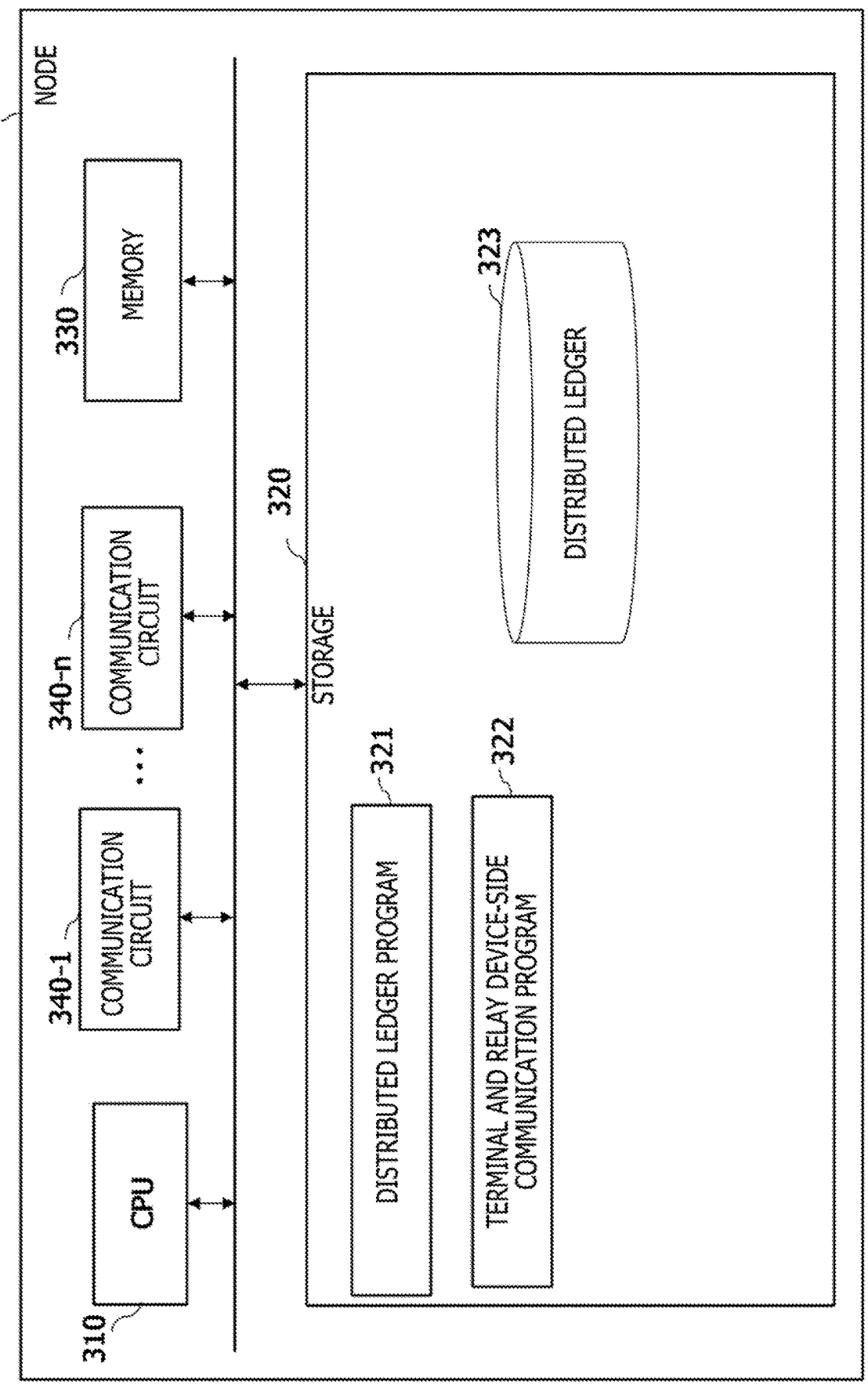
FIG. 4 is a diagram illustrating a configuration example of a node 300.

FIG. 4 is a diagram illustrating a configuration example of a node 300. The node 300 is, for example, a server machine or a computer.

The node 300 includes a CPU 310, a storage 320, a memory 330, and communication circuits 340-1 to 340-n.

The storage 320 is an auxiliary storage device, such as a flash memory, an HDD, or an SSD, for storing programs and data. The storage 320 stores a distributed ledger program 321, a terminal and relay device-side communication program 322, and a distributed ledger 323.

The memory 330 is an area in which a program stored in the storage 320 is loaded. The memory 330 may also be used as an area in which a program stores data.

The communication circuits 340-1 to 340-n (hereinafter, may be referred to as communication circuits 340) are interfaces coupled to a network. The communication circuit 340 is, for example, an interface device having a communication port for coupling to the Internet, such as a network interface card. The node 300 communicates with another node 300, a terminal device 100, and a relay device 200 via the communication circuit 340.

The CPU 310 is a processor that loads a program stored in the storage 320 into the memory 330, executes the loaded program, constructs each unit, and implements each process.

By executing the distributed ledger program 321, the CPU 310 constructs a distributed ledger unit and performs a distributed ledger process. The distributed ledger process is a process of registering, deleting, and updating the terminal device 100 in the distributed ledger and sharing the distributed ledger with other nodes 300. In the distributed ledger process, the node 300 acquires the identifier and the public key from the terminal device 100 and registers the acquired identifier and public key in the distributed ledger. The content of the updated distributed ledger is shared with other nodes 300.

By executing the terminal and relay device-side communication program 322, the CPU 310 constructs a device communication unit and performs a terminal and relay device-side communication process. The terminal and relay device-side communication process is a process of transmitting or receiving a message to or from the terminal device 100 or the relay device 200.

<Communication Between Terminal Devices>

Communication between terminal devices is realized by performing a registration process, a communication request process, and a communication process. The respective processes will be described.

<1. Registration Process>

The registration process is, for example, a process performed at a timing when the terminal device 100 enters the communication system 10, and is a process of registering information related to the newly entered terminal device 100 in the node 300 (distributed ledger) and the relay device 200. The message transmitted and received between the terminal device 100-1 and the relay device 200 is a control message, and the terminal device 100-1 transmits and receives the message to and from the relay device 200 using the communication port P11 (control port).

Figure 5:
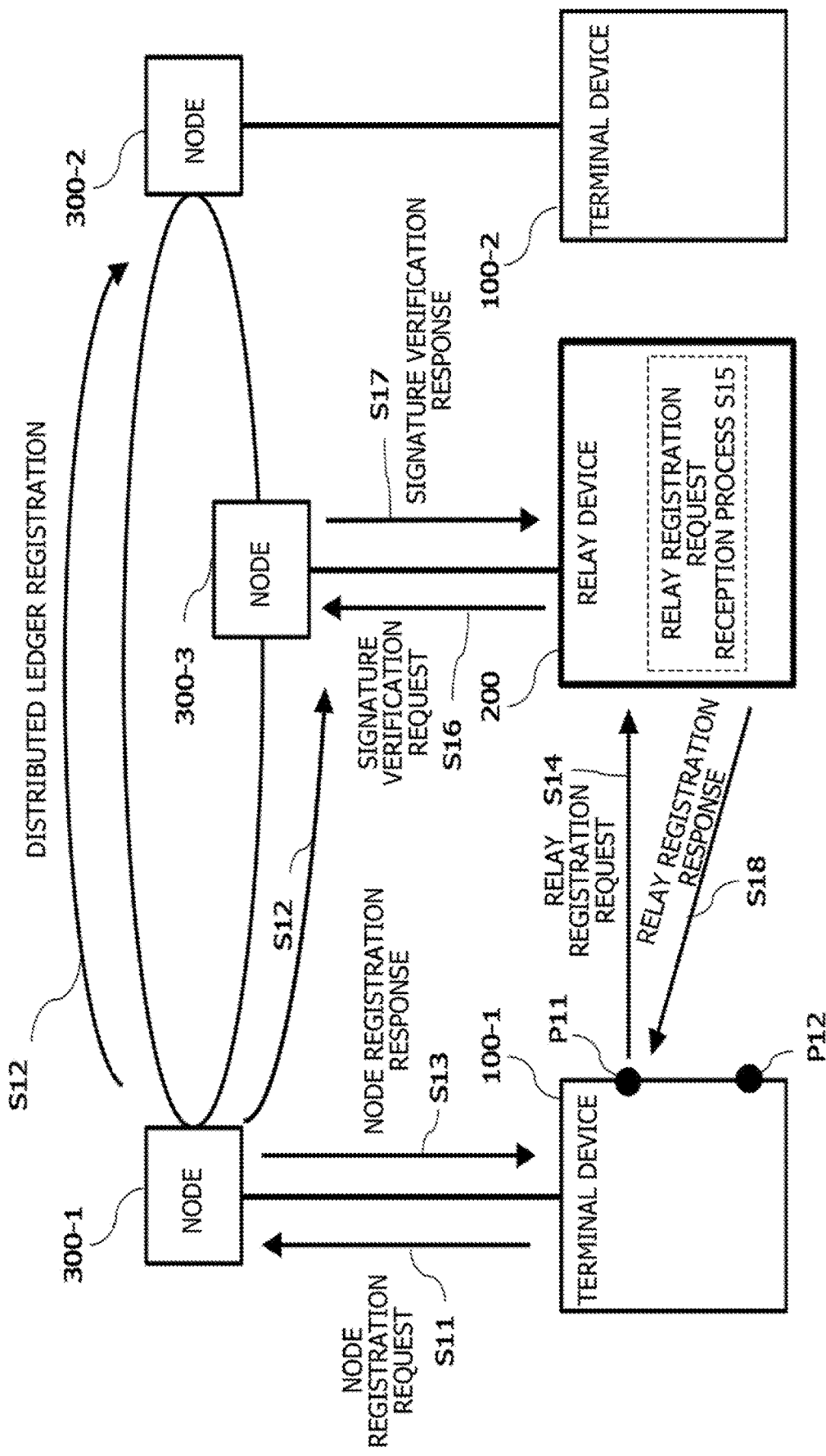
FIG. 5 is a diagram illustrating an example of a sequence of registration process in the communication system 10.

FIG. 5 is a diagram illustrating an example of a sequence of a registration process in the communication system 10. FIG. 5 is a diagram illustrating an example of a case where the terminal device 100-1 newly enters (participates in) the communication system 10.

FIG. 6 is a diagram illustrating an example of information related to each device included in the communication system 10. Hereinafter, in the embodiment, it is assumed that the network address, the identifier, the public key, and a secret key of each device conform to FIG. 6.

The terminal device 100-1 transmits a node registration request to the node 300-1 coupled (corresponding) thereto (S11). The node registration request is a message for requesting the node 300 to register information related to the terminal device 100 (for example, including a public key, a network address, and an identifier of the terminal device 100 or a user of the terminal device 100) in the distributed ledger.

FIG. 7A to 7D are diagrams illustrating an example of messages transmitted and received between the node 300 and the terminal device 100 or the relay device 200. FIG. 7A is a diagram illustrating an example of a node registration request S11.

The node registration request is a message including a transmission source address, a transmission destination address, a message type, a transmission source identifier, and a public key.

As the transmission source address and the transmission destination address, the network address of the transmission source device and the network address of the transmission destination device of the node registration request are posted. In a case of the node registration request S11, a network address "IP1" of the terminal device 100-1 that is the transmission source of the message is posted as the transmission source address, and a network address "IPN1" of the node 300-1 that is the transmission destination of the message is posted as the transmission destination address.

In each message, the transmission source address and the transmission destination address of the message are posted as the transmission source address and the transmission destination address, and for example, in a message transmitted to another terminal device 100 via the relay device 200, the transmission destination address is the network address of the relay device 200. It is also assumed that even the communication port number may be posted as the transmission source address and the transmission destination address. Hereinafter, in the description of the message, the transmission source address and the transmission destination address may be omitted.

As the message type, information indicating the type of the message is posted. In the case of the node registration request S11, information indicating "node registration request" that is the type of the message is posted as the message type. Hereinafter, in the description of the message, the description of the message type may be omitted.

As the transmission source identifier, the identifier of the transmission source device or the identifier of the user of the identifier of the transmission source device is posted. In the case of the node registration request S11, an identifier "abc" of the terminal device 100-1 is posted as the transmission source identifier.

As the public key, information related to a public key used for communication by the terminal device 100 that is a transmission source of the node registration request is posted. In the case of the node registration request S11, a public key "Pka" used by the terminal device 100-1 for communication is posted.

Returning to the sequence of FIG. 5, upon receiving the node registration request, the node 300-1 updates the distributed ledger included in the own device based on the received information, and performs a distributed ledger process of requesting (instructing) the other nodes 300-2 and 300-3 to update the distributed ledgers to have the same content as that of the distributed ledger of the own device (S12). Accordingly, the distributed ledgers of the nodes 300 have the same content.

FIG. 8 is a diagram illustrating an example of a distributed ledger. The distributed ledger includes a device, an address, an identifier, and a public key as information elements to be managed. FIG. 8 is an example of a distributed ledger in which the registration of the relay device 200 and the terminal device 100-2 has already been completed.

The device includes the name or identifier of each device. In response to receiving the node registration request from the terminal device 100-1, the node 300-1 stores the information of the terminal device 100-1 in the distributed ledger. The device may be managed as an identifier described below.

The address includes a network address of each device. The distributed ledger does not store anything as the address of the terminal device 100-1. In the first embodiment, the node 300 does not store the network address for communication of the terminal device 100 in the distributed ledger, so a malicious third party is not allowed to acquire the network address for communication of the terminal device 100 and more secure communication may be provided.

The identifier includes an identifier of each device or a user of each device. The distributed ledger stores "abc" as the identifier of the terminal device 100-1.

The public key is a public key used by each device for communication. The distributed ledger stores "Pka" as the public key of the terminal device 100-1.

Returning to the sequence of FIG. 5, upon updating the distributed ledger, the node 300-1 transmits a node registration response to the terminal device 100-1 (S13). The node registration response is a message notifying that the information of the device is registered in the distributed ledger.

FIG. 7B is a diagram illustrating an example of the node registration response S13. The node registration response is a message including a transmission source address, a transmission destination address, a message type, a relay device identifier, and a relay device address.

An identifier of a relay device that relays communication between terminal devices is posted as the relay device identifier. In a case of the node registration response S13, an identifier "xyz" of the relay device 200 is posted as the relay device identifier.

A network address of a relay device that relays communication between terminal devices is posted as the relay device address. In the case of the node registration response S13, a network address "IP3" of the relay device 200 is posted as the relay device address.

Returning to the sequence of FIG. 5, the terminal device 100-1 receives the node registration response S13 and acquires the network address and the identifier of the relay device 200. The terminal device 100 may acquire the network address and the identifier of the relay device 200 not from the node registration response but from another message (for example, a message transmitted and received at the start of communication).

Upon receiving the node registration response S13, the terminal device 100-1 transmits a relay registration request to the relay device 200 (S14). The relay registration request is a message for the terminal device 100 to request the relay device 200 to register information related to the own device.

FIG. 9A to 9B are diagrams illustrating an example of a message between the terminal device 100 and the relay device 200. FIG. 9A is a diagram illustrating an example of a relay registration request S14. The relay registration request is a message including a transmission source address, a transmission destination address, a type, a message type, a transmission source identifier, a communication address, and a signature.

As the type, information indicating whether the message type is for control or for communication is posted. The control message is a message used for control such as start and end of communication between the terminal devices 100. The control message is transferred to the transmission destination terminal device 100 when the signature authentication described below is successful. On the other hand, the communication message is a message including communication data transmitted and received between the terminal devices 100. In addition to the signature authentication, the communication message is transferred to the terminal device 100 of the transmission destination when the communication is in progress in the communication state managed by the relay device 200. The relay registration request S14 is a control message, and "control" indicating that the type is a control message is posted. In the following description of messages, the types are assumed to be the same.

For the transmission source identifier, an identifier of a transmission source device is posted. The transmission source identifier is used in the signature authentication process performed by the relay device 200, which will be described later. In a case of the relay registration request S14, the identifier "abc" of the terminal device 100-1 is posted as the transmission source identifier.

As the communication address, a network address used for transmission and reception of the communication message by a transmission source device is posted. For example, by setting the communication address to a network address different from that for transmission and reception of the control message, security is improved. Here, the communication port is specified for the communication address and is made different from the communication port for transmission and reception of the control message, thereby improving the security. In the case of the relay registration request S14, "IP1 port P12" that is the network address and the communication port of the terminal device 100-1 is posted as the communication address.

As the signature, signature data is posted. For example, the terminal device 100 and the relay device 200 authenticate the transmission source of the signature data by using the public key to verify the signature data generated with the secret key. In the case of the relay registration request S14, signature data generated with a secret key Ska of the terminal device 100-1 is posted as the signature.

Returning to the sequence of FIG. 5, upon receiving the relay registration request S14, the relay device 200 performs a relay registration request reception process (S15).

FIG. 10 is a diagram illustrating an example of a processing flowchart of the relay registration request reception process S15. In the relay registration request reception process S15, the relay device 200 performs a signature authentication process (S100). The signature authentication process S100 is a process of authenticating the signature of the received message, and will be described in detail later.

When the signature authentication is successful (Yes in S15-1), the relay device 200 transmits a relay registration response to the terminal device 100 of the transmission source (S15-2), and updates a control information management table and a communication information management table (S15-3). The control information management table and the communication information management table will be described later.

On the other hand, when the signature authentication fails (No in S15-1), the relay device 200 determines that the terminal device 100 of the transmission source is not the terminal device 100 formally authenticated on the communication system 10, discards the relay registration request, and ends the process.

FIG. 11 are diagrams illustrating an example of a control information management table and a communication information management table. FIG. 11A is a diagram illustrating an example of a control information management table. The control information management table includes an identifier and a control address.

The identifier is an identifier of the registered terminal device 100. In FIG. 11A, the identifier "abc" of the terminal device 100-1 and the identifier "der" of the terminal device 100-2 are registered.

The control address is a network address and a port number used for a control message of the terminal device 100 corresponding to the identifier. In FIG. 11A, the network address and the control port "IP1 port P11" of the terminal device 100-1, and the network address and the control port "IP2 port P21" of the terminal device 100-2 are registered.

FIG. 11B is a diagram illustrating an example of a communication information management table. The communication information management table includes a reception-side identifier, a transmission-side identifier, and a reception-side communication address.

The reception-side identifier is an identifier of the terminal device 100 that permits reception of the communication message. In FIG. 11B, the identifier "abc" of the terminal device 100-1 and the identifier "def" of the terminal device 100-2 are registered.

The transmission-side identifier is an identifier of the terminal device 100 of a transmission source from which the terminal device 100 registered in the reception-side identifier permits reception. In FIG. 11B, nothing is registered. As the transmission-side identifier, nothing is registered in a state in which communication is not performed.

The reception-side communication address is a network address and a port number used by the terminal device 100 registered in the reception-side identifier for transmission and reception of the communication message. In FIG. 11B, the network address and the communication port "IP1 port 12" of the terminal device 100-1, and the network address and the communication port "IP2 port 22" of the terminal device 100-2 are registered.

Figure 12:
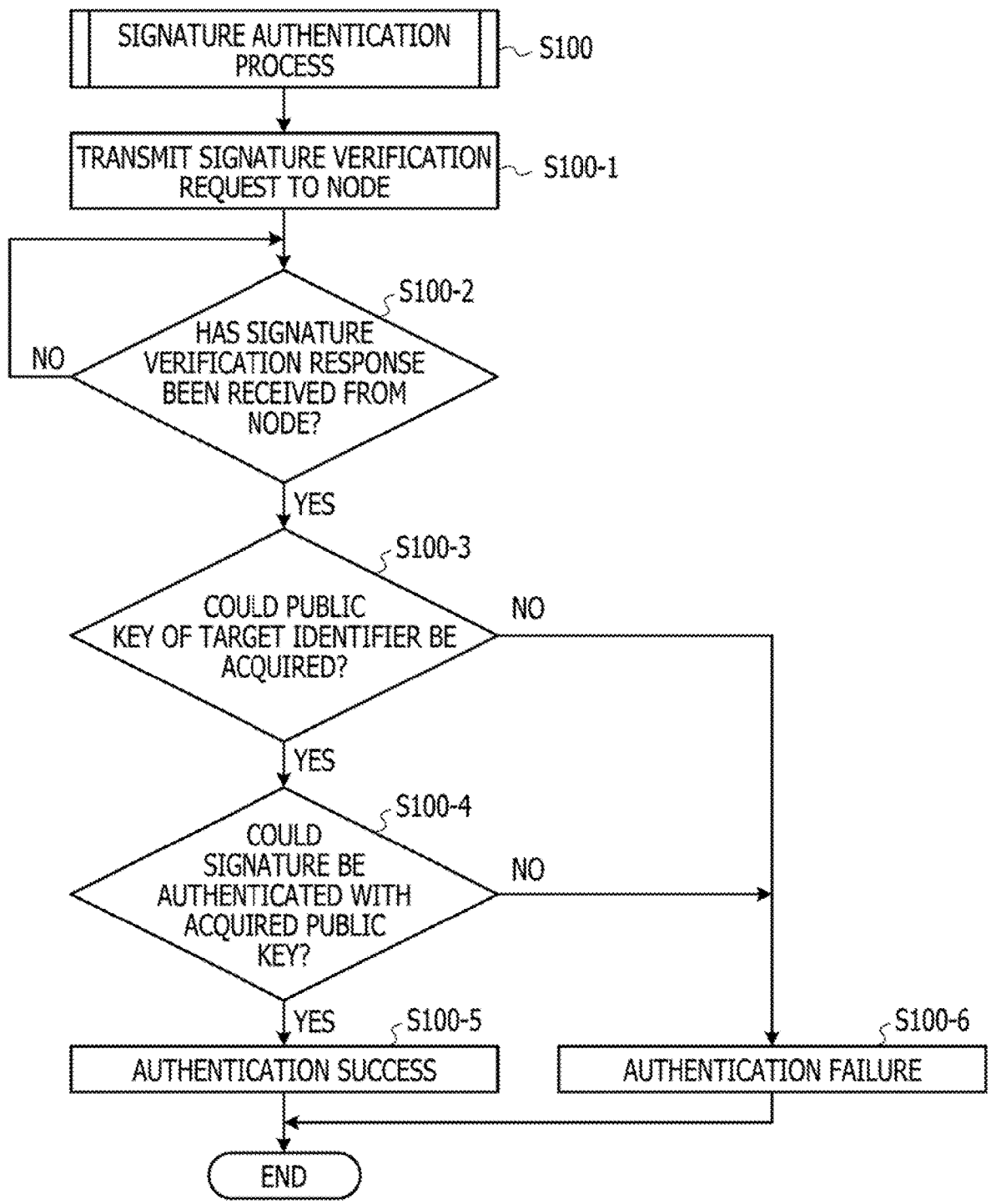
FIG. 12 is a diagram illustrating an example of a processing flowchart of a signature authentication process S100.

FIG. 12 is a diagram illustrating an example of a processing flowchart of the signature authentication process S100. In the signature authentication process S100, the relay device 200 acquires the public key of the terminal device 100 having the identifier of the transmission source of the message to be subjected to signature authentication from the node 300 coupled thereto, and authenticates whether the transmission source of the message is valid (whether or not it is the registered terminal device).

In the signature authentication process S100, the relay device 200 transmits a signature verification request to the node 300 coupled thereto (S100-1). The signature verification request is a message for requesting the node 300 to transmit the public key corresponding to the identifier included in the message. The information included in the signature verification request will be described later.

The relay device 200 performs the signature authentication process S100 in each process when receiving the message from the terminal device 100. When the authentication fails in the signature authentication process S100 (when the authentication results in an error), the relay device 200 performs a discard process of discarding the received message.

The relay device 200 waits for a signature verification response from the node 300 (No in S100-2). The signature verification response is a message for delivering the public key of the terminal device 100 having a target identifier to the relay device 200. The information included in the signature verification response will be described later.

Upon receiving the signature verification response from the node 300 (Yes in S100-2), the relay device 200 confirms whether or not the public key corresponding to the target identifier has been acquired (S100-3). For example, when the target identifier is not registered in the distributed ledger of the node 300, the node 300 does not post the public key in the signature verification response. In this case, the relay device 200 determines that the public key may not be acquired.

When the public key is acquired (Yes in S100-3), the relay device 200 authenticates the signature of the received message using the acquired public key (S100-4). When the signature authentication is successful (Yes in S100-4), the relay device 200 determines that the authentication of the message is successful (S100-5), and when the signature authentication fails (No in S100-4), the relay device 200 determines that the authentication of the message fails (S100-6) and ends the process.

On the other hand, when the public key may not be acquired (No in S100-3), the relay device 200 determines that the identifier is not registered in the distributed ledger, determines that the authentication of the message fails (S100-6), and ends the process.

Returning to the sequence of FIG. 5, in the relay registration request reception process S15, the relay device 200 transmits a signature verification request to the node 300-3 (S16, S100-1 in FIG. 12).

FIG. 7C illustrates an example of the signature verification request S16. The signature verification request includes a transmission source address, a transmission destination address, a message type, and an identifier. The identifier is an identifier of a transmission source of a message to be subjected to signature authentication. In a case of the signature verification request S16, the identifier "abc" of the terminal device 100-1 that is the transmission source of the relay registration request S14 is posted as the identifier.

Returning to the sequence of FIG. 5, upon receiving the signature verification request S16, the node 300-1 detects the public key "Pka" corresponding to the identifier "abc" from the distributed ledger, posts the public key "Pka" in the signature verification response, and sends a reply to the relay device 200 (S17).

FIG. 7D illustrates an example of the signature verification response S17. The signature verification response includes a transmission source address, a transmission destination address, a message type, an identifier search result, and a public key. The identifier search result is a result of searching for the identifier of the signature verification request from the distributed ledger. In a case of the signature verification response S17, since the identifier "abc" is already registered in the distributed ledger and the node 300-1 may detect the identifier "abc", OK (indicating that the search is successful) is posted as the identifier search result. The public key is a public key corresponding to the identifier of the signature verification request. In the case of the signature verification response S17, the public key "Plea" corresponding to the identifier "abc" is posted as the public key.

Returning to the sequence of FIG. 5, upon receiving the signature verification response S17, the relay device 200 confirms the result of the signature authentication process S100 performed in the relay registration request reception process S15, recognizes that the authentication is successful (Yes in S15-1 in FIG. 10), and transmits a relay registration response to the terminal device 100-1 (S18, S15-2 in FIG. 10).

FIG. 9B is a diagram illustrating an example of the relay registration response S18. The relay registration response includes a transmission source address, a transmission destination address, a type, a message type, a transmission source identifier, and a registration result. The transmission source identifier is an identifier of the relay device 200 that is the transmission source of the relay registration response. In a case of the relay registration response S18, the identifier "xyz" of the relay device 200 is posted as the transmission source identifier. The registration result indicates whether or not the identifier, the communication address, and the like requested by the relay registration request are registered in an internal table of the relay device 200. In the case of the relay registration response S18, since the identifier "abc" and the communication port "IP1 port P12" of the relay registration request S14 are registered in the control information management table or the communication information management table, OK (registered) is posted as the registration result.

Returning to the sequence of FIG. 5, the terminal device 100-1 receives the relay registration response S18, recognizes that the registration to the relay device 200 is completed, and completes the registration process.

<2. Communication Request Process>

The communication request process is, for example, a process when the terminal device 100 for which the registration process has been completed starts communication with another terminal device 100. The messages transmitted and received between the terminal devices 100-1 and 100-2 to and from the relay device 200 are control messages, and the terminal device 100-1 uses the communication port P11 (control port) and the terminal device 100-2 uses the communication port P21 (control port) to transmit and receive messages to and from the relay device 200.

Figure 13:
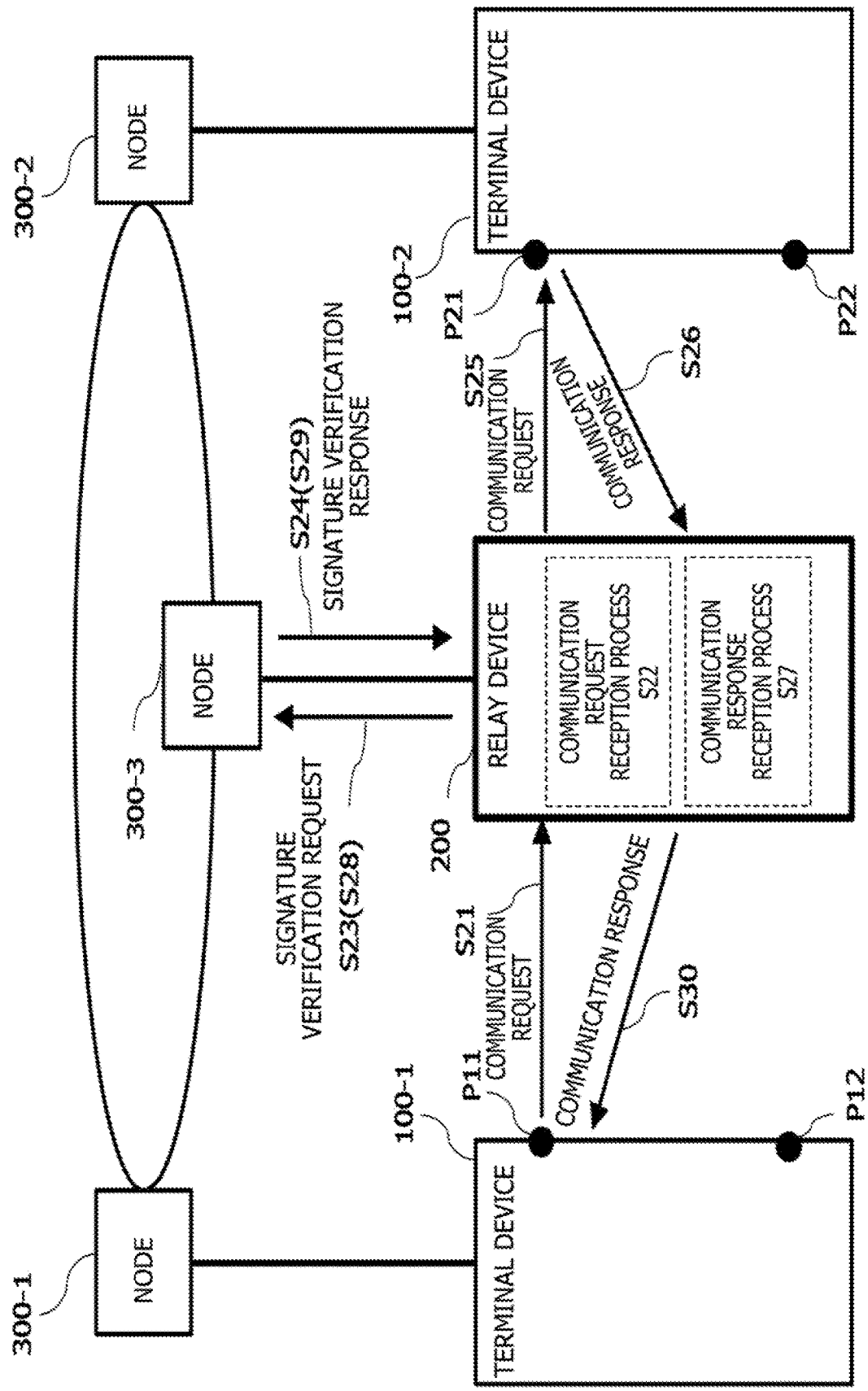
FIG. 13 is a diagram illustrating an example of a sequence of a communication request process.

FIG. 13 is a diagram illustrating an example of a sequence of the communication request process. When starting communication with the terminal device 100-2, the terminal device 100-1 transmits a communication request to the relay device 200 (S21).

FIG. 14A to 14D are diagrams illustrating an example of messages transmitted and received between the terminal device 100 and the relay device 200. FIG. 14A is a diagram illustrating an example of a communication request S21.

The communication request is a message including a transmission source address, a transmission destination address, a type, a message type, a transmission source identifier, a transmission destination identifier, and a signature.

As the transmission source identifier, the identifier of the terminal device 100 that requests the start of communication is posted. In a case of the communication request S21, the identifier "abc" of the terminal device 100-1 is posted as the transmission source identifier.

As the transmission destination identifier, the identifier of the terminal device 100 on the side where the start of communication is requested is posted. In the case of the communication request S21, the identifier "def" of the terminal device 100-2 is posted as the transmission destination identifier.

As the signature, signature data is posted. In the case of the communication request S21, signature data generated with the secret key Ska of the terminal device 100-1 is posted as the signature.

Returning to the sequence of FIG. 13, upon receiving the communication request S21, the relay device 200 performs a communication request reception process (S22).

Figure 15:
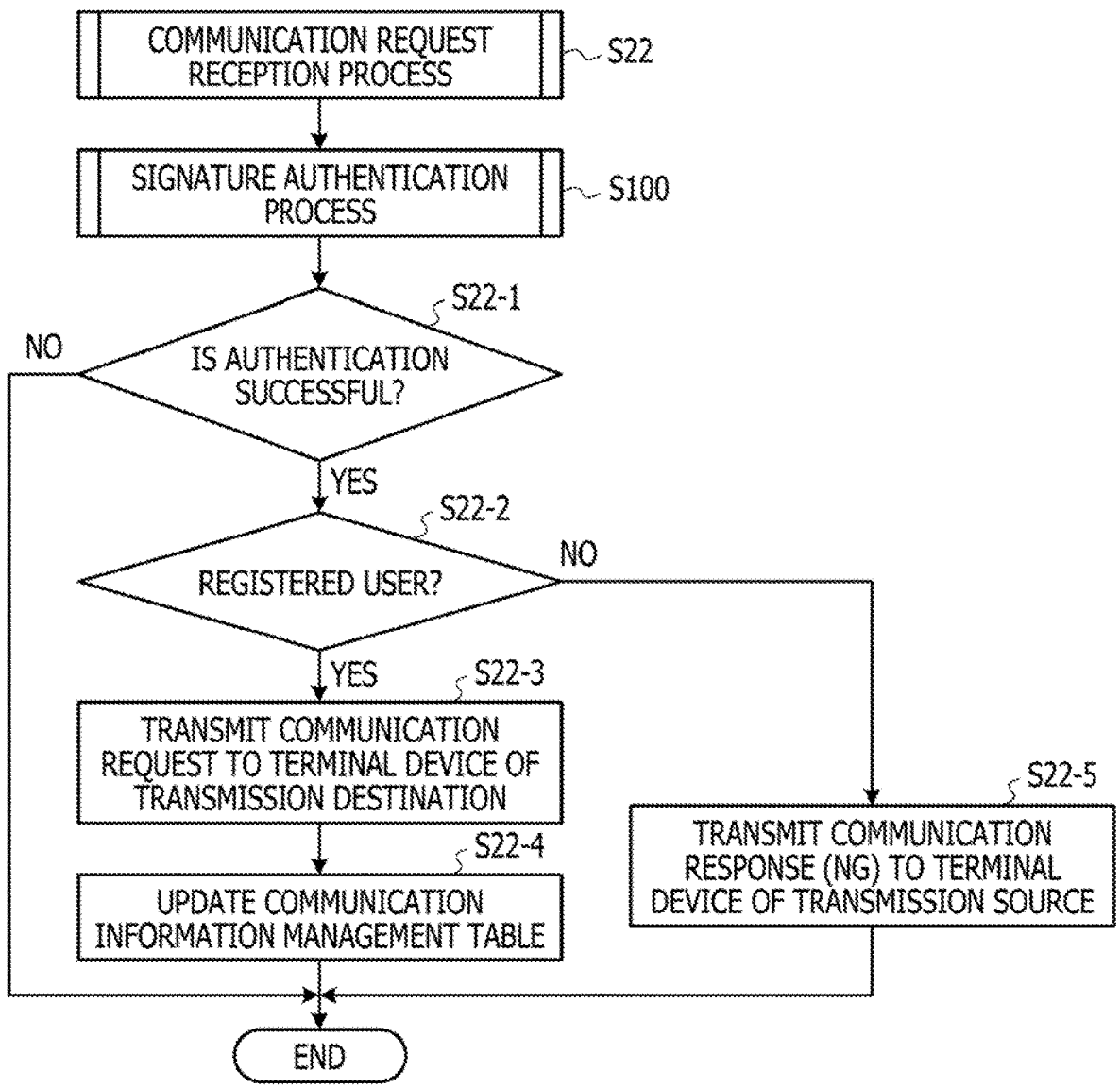
FIG. 15 is a diagram illustrating an example of a processing flowchart of a communication request reception process S22.

FIG. 15 is a diagram illustrating an example of a processing flowchart of the communication request reception process S22. In the communication request reception process S22, the relay device 200 performs the signature authentication process S100. As a result of the signature authentication process S100, when the authentication of the signature of the received message is successful (Yes in S22-1), the relay device 200 confirms whether or not the user has been registered in the control information management table (S22-2).

On the other hand, as a result of the signature authentication process S100, when the authentication of the signature of the received message fails (No in S22-1), the relay device 200 discards the received message and ends the process.

When the user is already registered in the control information management table (Yes in S22-2), the relay device 200 transmits a communication request to the terminal device 100 of the transmission destination (S22-3), updates the communication information management table (S22-4), and ends the process. In the process S22-4, the relay device 200 updates the transmission-side identifier corresponding to the reception-side identifier in which the identifier of the terminal device 100 that is the transmission source of the communication request is stored to the transmission destination identifier. By updating the communication information management table as described above, at least the terminal device 100 that has transmitted the communication request is set to a state in which reception of the communication message from the terminal device 100 of the transmission destination is permitted.

On the other hand, when the user is not registered in the control information management table (No in S22-2), the relay device 200 transmits a communication response (NG) to the terminal device 100 of the transmission source (S22-5), and ends the process. When the relay device 200 receives a communication request from an unregistered terminal device 100, the relay device 200 returns a communication response (NG) and notifies the terminal device 100 of the transmission source that either the registration of the terminal device 100 in the distributed ledger of the node 300 or the registration of the terminal device 100 in the relay device 200 is not correctly completed.

Returning to the sequence of FIG. 13, in the communication request reception process S22, the relay device 200 performs the signature authentication process S100, transmits a signature verification request to the node 300-3 (S23, S100-1 in FIG. 12), receives a signature verification response from the node 300-3 (S24, S100-2 in FIG. 12), and authenticates the signature of the received communication request S21. The relay device 200 authenticates that the terminal device 100-1 is a valid terminal device 100 (S100-4 in FIG. 12), and determines that the authentication is successful (Yes in S22-1 in FIG. 15). The relay device 200 confirms that the terminal device 100-1 is registered in the control information management table (Yes in S22-2 in FIG. 15), and transmits a communication request to the terminal device 100-2 of the transmission destination (S25, S22-3 in FIG. 15).

FIG. 14B is a diagram illustrating an example of a communication request S25. The relay device 200 transfers the content of the received communication request S21 except for the transmission source address and the transmission destination address, and transmits the communication request S25 to the terminal device 100-2.

Returning to the sequence of FIG. 13, the relay device 200 updates the communication information management table (S22-4 in FIG. 15), ends the communication request reception process S22, and waits for a communication response.

FIG. 16A to 16B are diagrams illustrating an example of a communication information management table. In the communication information management table, the relay device 200 sets the state illustrated in FIG. 11B (the transmission-side identifier "–" corresponding to the reception-side identifier "abc") to the state as illustrated in FIG. 16A in which the transmission-side identifier corresponding to the reception-side identifier "abc" is "clef" that is the transmission destination identifier included in the communication request.

Returning to the sequence of FIG. 13, upon receiving a communication response from the terminal device 100-2 (S26), the relay device 200 performs a communication response reception process (S27).

FIG. 14C is a diagram illustrating an example of the communication response S26. The communication response is a message including a transmission source address, a transmission destination address, a type, a message type, a transmission source identifier, a transmission destination identifier, communication permission, and a signature.

As the transmission source identifier, an identifier of the terminal device 100 that permits (or does not permit) the start of communication is posted. In a case of the communication response S26, the identifier "def" of the terminal device 100-2 is posted as the transmission source identifier.

As the transmission destination identifier, an identifier of the terminal device 100 permitted (or not permitted) to start communication is posted. In the case of the communication response S26, the identifier "abc" of the terminal device 100-1 is posted as the transmission destination identifier.

The communication permission is information indicating whether or not to permit communication (whether or not to permit reception of a communication message). In the case of the communication response S26, "OK" indicating that the terminal device 100-2 permits the reception of the communication message from the terminal device 100-1 is posted as the communication permission.

As the signature, signature data is posted. In the case of the communication response S26, signature data generated with a secret key Skd of the terminal device 100-2 is posted as the signature.

Figure 17:
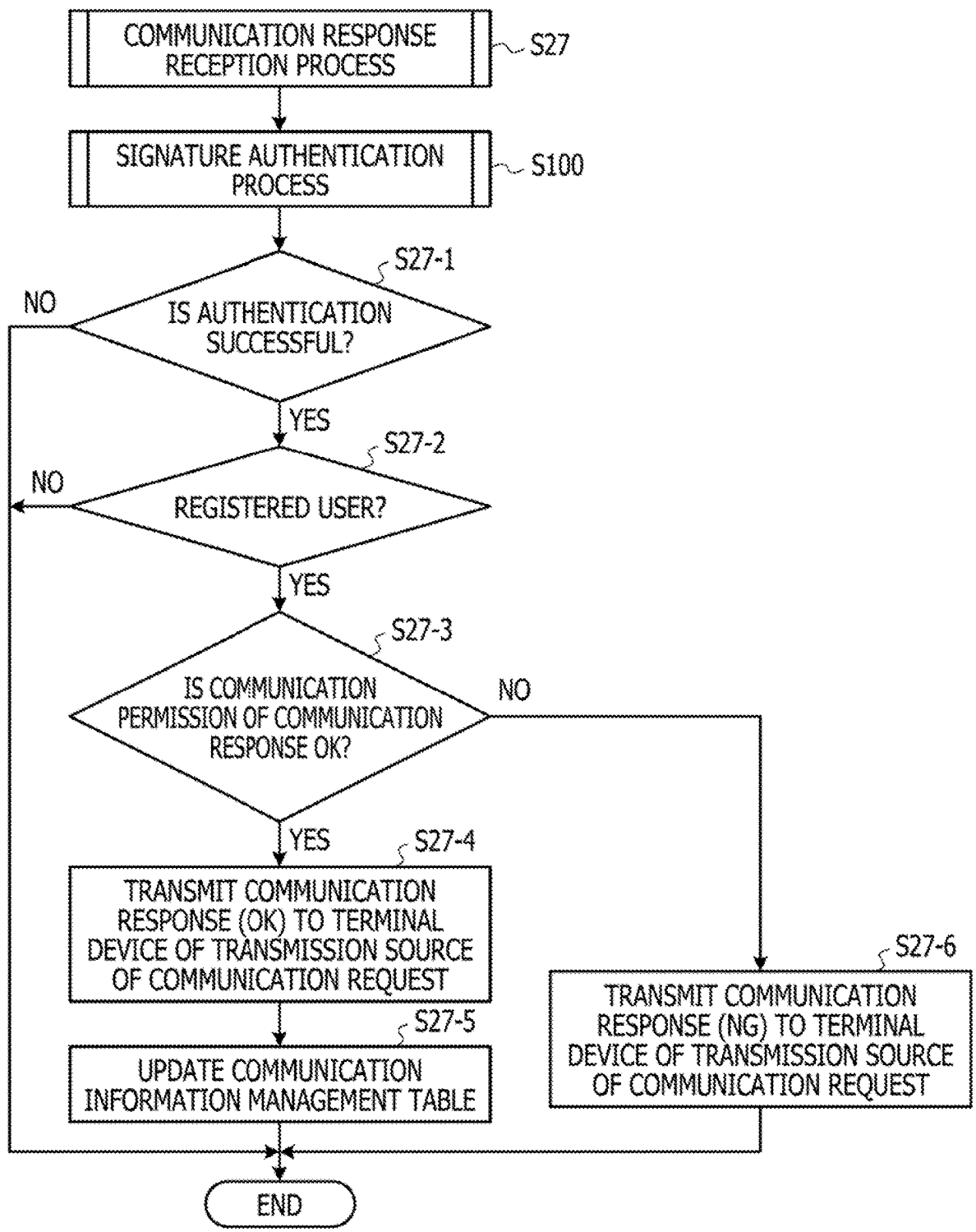
FIG. 17 is a diagram illustrating an example of a processing flowchart of a communication response reception process S27.

FIG. 17 is a diagram illustrating an example of a processing flowchart of the communication response reception process S27. In the communication response reception process S27, the relay device 200 performs the signature authentication process S100. As a result of the signature authentication process S100, when the authentication of the signature of the received message is successful (Yes in S27-1), the relay device 200 confirms whether or not the user is already registered in the control information management table (S27-2).

When the user has been registered in the control information management table (Yes in S27-2), the relay device 200 confirms whether or not the communication permission of the communication response is OK (S27-3). When the communication permission of the communication response is OK (Yes in S27-3), the relay device 200 transmits a communication response (OK) to the terminal device 100 of the transmission destination (the terminal device 100 of the transmission source of the communication request) (S27-4), updates the communication information management table (S27-5), and ends the process. In the process S27-5, the relay device 200 updates the transmission-side identifier corresponding to the reception-side identifier in which the identifier of the terminal device 100 that is the transmission source of the communication response (OK) is stored to the transmission destination identifier. By updating the communication information management table as described above, the terminal device 100 that has transmitted the communication response (OK) is set to a state in which reception of the communication message from the terminal device 100 of the transmission destination is permitted. For example, by performing both the update process S22-4 in the communication request reception process S22 and the update process S27-5 in the communication response reception process S27, a state is set in which the communicating terminal devices 100 are permitted to transmit and receive messages to and from each other.

On the other hand, when the communication permission of the communication response is NG (No in S27-3), the relay device 200 transmits the communication response (NG) to the terminal device 100 of the transmission destination (the terminal device 100 of the transmission source of the communication request) (S27-6), and ends the process.

On the other hand, as a result of the signature authentication process S100, when the authentication of the signature of the received message fails (No in S27-1) and when the user is not registered in the control information management table (No in S27-2), the relay device 200 discards the received message and ends the process.

Returning to the sequence of FIG. 13, in the communication response reception process S27, the relay device 200 performs the signature authentication process S100, transmits a signature verification request to the node 300-3 (S28, S100-1 in FIG. 12), receives a signature verification response from the node 300-3 (S29, S100-2 in FIG. 12), and authenticates the signature of the received communication response S26. The relay device 200 authenticates that the terminal device 100-2 is a valid terminal device 100 (S100-4 in FIG. 12), and determines that the authentication is successful (Yes in S27-1 in FIG. 17). The relay device 200 confirms that the terminal device 100-2 is registered in the control information management table (Yes in S27-2 in FIG. 17), and transmits a communication response (OK) to the terminal device 100-1 of the transmission destination (S30, S27-4 in FIG. 17).

FIG. 14D is a diagram illustrating an example of the communication response S30. The relay device 200 transfers the content of the received communication response S26 except for the transmission source address and the transmission destination address, and transmits the communication response S30 to the terminal device 100-1.

Returning to the sequence of FIG. 13, the relay device 200 updates the communication information management table (S27-5 in FIG. 17), and ends the communication response reception process S27.

In the communication information management table, the relay device 200 sets the state illustrated in FIG. 16A (the transmission-side identifier "–" corresponding to the reception-side identifier "def") to the state as illustrated in FIG. 16B in which the transmission-side identifier corresponding to the reception-side identifier "def" is "abc" that is the transmission destination identifier included in the communication response. As a result, the terminal device 100-1 and the terminal device 100-2 are set to a state in which messages are permitted to be transmitted and received to and from each other.

<3. Communication Process>

The communication process is, for example, a process in which the terminal devices 100 that permit communication messages to be transmitted and received to and from each other, transmit and receive communication data. In the communication process, messages transmitted and received between the terminal devices 100-1 and 100-2 and the relay device 200 are communication messages, and the terminal device 100-1 uses the communication port P12 (communication port) and the terminal device 100-2 uses the communication port P22 (communication port) to transmit and receive the messages to and from the relay device 200.

FIG. 18 is a diagram illustrating an example of a sequence of a communication process. The terminal device 100-1 transmits communication data to the terminal device 100-2 via the relay device 200.

The terminal device 100-1 transmits communication data addressed to the terminal device 100-2 to the relay device 200 (S41).

FIG. 19A to 19B are diagrams illustrating an example of messages transmitted and received between the terminal device 100 and the relay device 200. FIG. 19A is a diagram illustrating an example of the communication data S41.

The communication data is a message including a transmission source address, a transmission destination address, a type, a message type, a transmission source identifier, a transmission destination identifier, a payload, and a signature.

As the transmission source identifier, the identifier of a terminal device 100 that is the transmission source of the communication data is posted. In a case of the communication data S41, the identifier "abc" of the terminal device 100-1 is posted as the transmission source identifier.

As the transmission destination identifier, an identifier of the terminal device 100 that is the transmission destination of the communication data is posted. In a case of the communication data S45, the identifier "def" of the terminal device 100-2 is posted as the transmission destination identifier.

The payload includes data (user data) transmitted and received through communication.

As the signature, signature data is posted. In a case of the communication data S41, signature data generated with the secret key Ska of the terminal device 100-1 is posted as the signature.

Returning to the sequence in FIG. 18, upon receiving the communication data S41, the relay device 200 performs a communication data reception process (S42).

Figure 20:
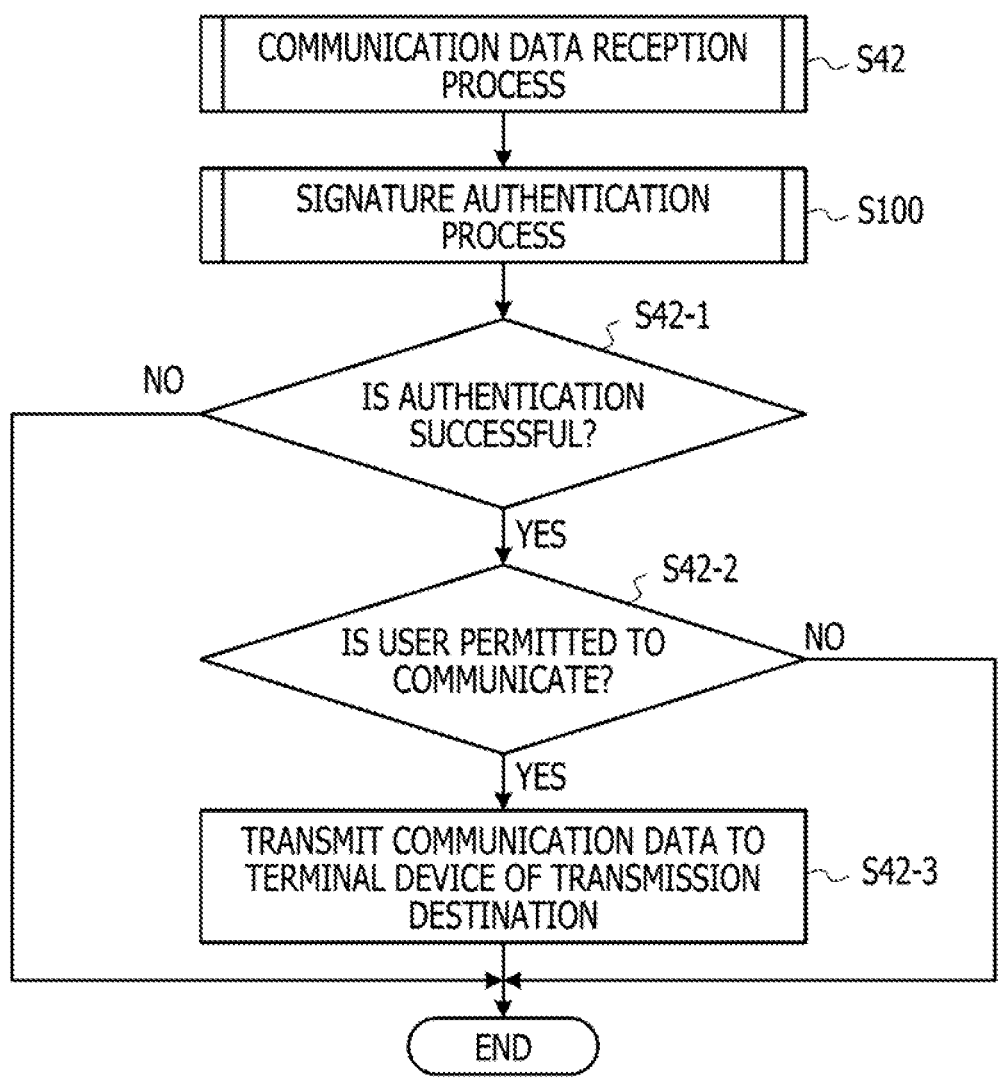
FIG. 20 is a diagram illustrating an example of a processing flowchart of a communication data reception process S42.

FIG. 20 is a diagram illustrating an example of a processing flowchart of the communication data reception process S42. In the communication data reception process S42, the relay device 200 performs the signature authentication process S100. As a result of the signature authentication process S100, when the signature of the received message is successfully authenticated (Yes in S42-1), the relay device 200 confirms whether or not the user is a communication-permitted user in the communication information management table (S42-2).

When the transmission destination identifier of the communication data is included in the reception-side identifier of the communication information management table and the transmission source identifier of the communication data is included in the transmission-side identifier of the communication information management table, the relay device 200 determines that the user of the communication data is permitted to communicate.

When the user is permitted to communicate (Yes in S42-2), the relay device 200 transmits the communication data to the terminal device of the transmission destination (S42-3), and ends the process. On the other hand, when the user is not permitted to communicate (NO in S42-2) or when the authentication fails (NO in S42-1), the relay device 200 discards the communication data and ends the process.

Returning to the sequence in FIG. 18, in the communication data reception process S42, the relay device 200 performs the signature authentication process S100, transmits a signature verification request to the node 300-3 (S43, S100-1 in FIG. 12), receives a signature verification response from the node 300-3 (S44, S100-2 in FIG. 12), and authenticates the signature of the received communication data S41. The relay device 200 authenticates that the terminal device 100-1 is a valid terminal device 100 (S100-4 in FIG. 12), and determines that the authentication is successful (Yes in S42-1 in FIG. 20). The relay device 200 confirms that the terminal device 100-1 is registered in the transmission-side identifier of the communication information management table and the terminal device 100-2 is registered in the corresponding reception-side identifier (Yes in S42-2 in FIG. 20), and transmits communication data to the terminal device 100-2 of the transmission destination (S45, S42-3 in FIG. 20).

FIG. 19B is a diagram illustrating an example of the communication data S45. The relay device 200 transfers the content of the received communication data S41 except for the transmission source address and the transmission destination address, and transmits the communication data S45 to the terminal device 100-2.

In the first embodiment, the relay device 200 relays transmission and reception of messages between terminal devices that perform communication. The relay device 200 acquires the public key from the distributed ledger of the node 300 and authenticates the signature of the message in the registration of the terminal device 100 and in relay of communication. As such, it is possible to transmit and receive a high security message for which signature authentication has been completed between terminal devices.

Second Embodiment

Next, a second embodiment will be described. The communication system 10 according to the second embodiment transmits and receives a communication rejection message for notifying or requesting that communication is not permitted between devices. In the second embodiment, processing at the time of receiving a communication rejection message during communication and processing at the time of receiving a communication response (NG) will be described.

<1. Processing at the Time of Communication Response (NG)>

Figure 21:
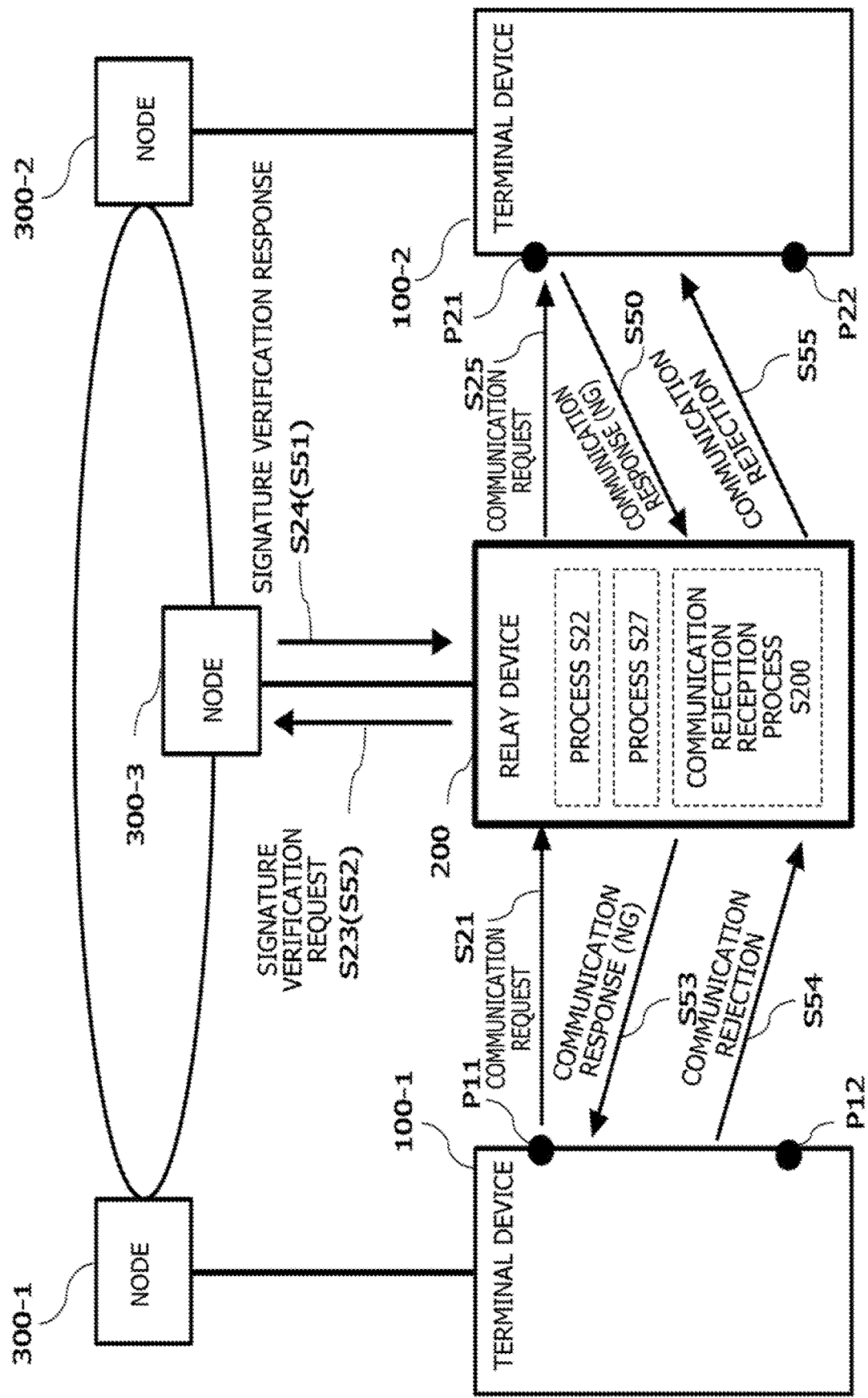
FIG. 21 is a diagram illustrating an example of a sequence when a terminal device 100-2 transmits a communication response (NG)

FIG. 21 is a diagram illustrating an example of a sequence when the terminal device 100-2 transmits a communication response (NG). The terminal device 100 may transmit a communication response (NG) that does not permit communication, for example, due to an operation by the user of the terminal device 100 or determination of an application running on the terminal device 100.

The steps from the communication request S21 to the communication request S25 are the same as the steps from the communication request S21 to the communication request S25 in the sequence in FIG. 13. The terminal device 100-2 transmits a communication response (NG) in response to the communication request from the terminal device 100-1.

FIG. 22A to 22B are diagrams illustrating an example of messages transmitted and received between the terminal device 100 and the relay device 200. FIG. 22A illustrates an example of the communication response (NG) S50.

The communication response is a message including a transmission source address, a transmission destination address, a type, a message type, a transmission source identifier, a transmission destination identifier, a payload, and a signature.

As the transmission source identifier, the identifier of the terminal device 100 that is the transmission source of the communication response is posted. In a case of the communication response (NG) S50, the identifier "def" of the terminal device 100-2 is posted as the transmission source identifier.

As the transmission destination identifier, the identifier of the terminal device 100 that is the transmission destination of the communication response is posted. In the case of the communication response (NG) S50, the identifier "abc" of the terminal device 100-1 is posted as the transmission destination identifier.

The communication permission is information indicating whether or not to permit communication (whether or not to permit reception of a communication message). In the case of the communication response S50, "NG" indicating that the terminal device 100-2 does not permit reception of the communication message from the terminal device 100-1 is posted as the communication permission.

As the signature, signature data is posted. In the case of the communication response S50, signature data generated with the secret key Skd of the terminal device 100-2 is posted as the signature.

Returning to the sequence in FIG. 21, upon receiving the communication response (NG) S50, the relay device 200 performs the communication response reception process S27. In the communication response reception process S27, the relay device 200 performs the signature authentication process S100, transmits a signature verification request to the node 300-3 (S51, S100-1 in FIG. 12), receives a signature verification response from the node 300-3 (S52, S100-2 in FIG. 12), and authenticates the signature of the received communication response (NG) S50. The relay device 200 authenticates that the terminal device 100-2 is a valid terminal device 100 (S100-4 in FIG. 12), and determines that the authentication is successful (Yes in S27-1 in FIG. 17). The relay device 200 confirms that the terminal device 100-2 is registered in the control information management table (Yes in S27-2 in FIG. 17). Since the communication permission of the communication response (NG) S50 is NG (S27-3 in FIG. 17), the relay device 200 transmits the communication response (NG) to the terminal device 100-1 of the transmission destination (S53, S27-4 in FIG. 17). FIG. 22B is a diagram illustrating an example of a communication response S53. Other than the transmission source address and the transmission destination address, this is the same as the communication response S50 illustrated in FIG. 22A.

Upon receiving the communication response (NG) S53, the terminal device 100-1 recognizes that a partner device (terminal device 100-2) has rejected the communication request of the own device (that the partner device has rejected reception of the communication message from the own device). In the terminal device 100-1, for example, when communication from the own device is rejected, the own device also rejects reception of a communication message from the partner device. The terminal device 100-1 transmits a communication rejection meaning that the own device rejects the reception of the communication message to the terminal device 100-2 via the relay device 200 (S54).

FIG. 23A to 23B are diagrams illustrating an example of messages transmitted and received between the terminal device 100 and the relay device 200. FIG. 23A is a diagram illustrating an example of a communication rejection S54.

The communication rejection is a message including a transmission source address, a transmission destination address, a type, a message type, a transmission source identifier, a transmission destination identifier, and a signature.

As the transmission source identifier, the identifier of the terminal device 100 that is the transmission source of the communication rejection is posted. In a case of communication rejection S54, the identifier "abc" of the terminal device 100-1 is posted as the transmission source identifier.

As the transmission destination identifier, an identifier of the terminal device 100 that is the transmission destination of the communication rejection is posted. In the case of the communication rejection S54, the identifier "def" of the terminal device 100-2 is posted as the transmission destination identifier.

As the signature, signature data is posted. In the case of the communication rejection S54, signature data generated with the secret key Ska of the terminal device 100-1 is posted as the signature.

Returning to the sequence of FIG. 21, upon receiving the communication rejection S54, the relay device 200 performs a communication rejection reception process (S200).

Figure 24:
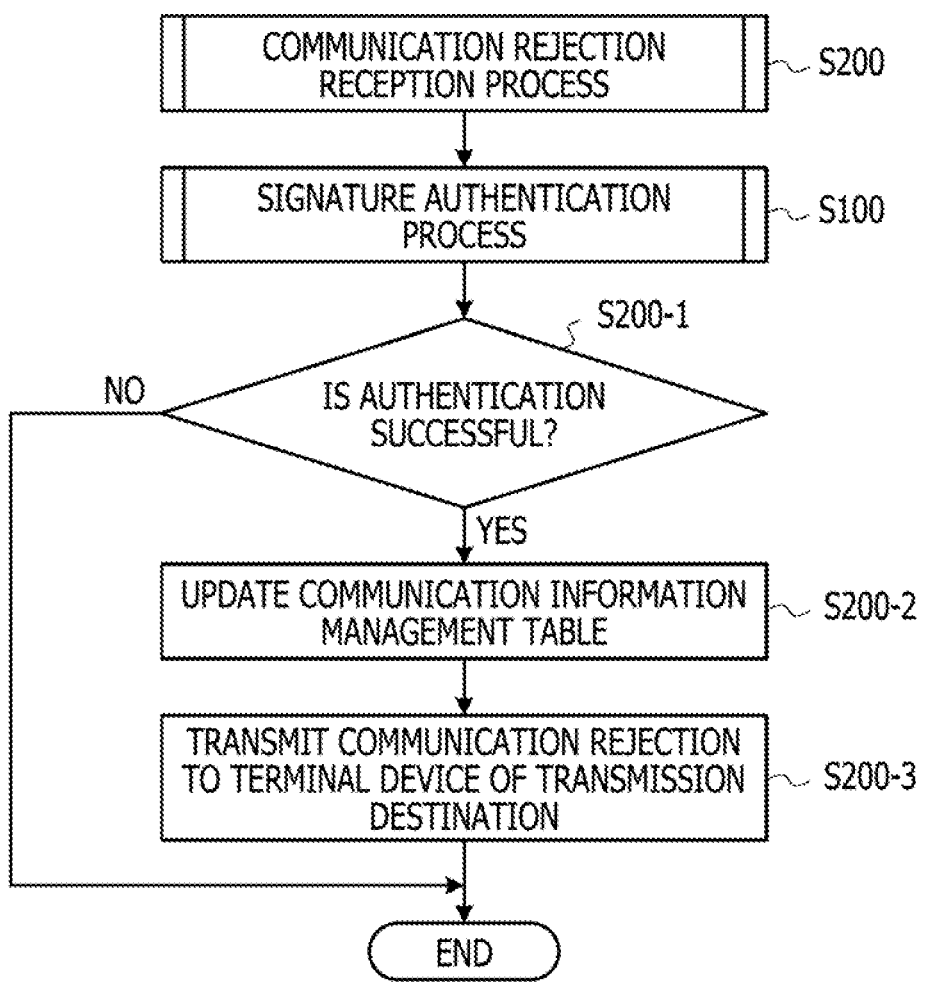
FIG. 24 is a diagram illustrating an example of a processing flowchart of a communication rejection reception process S200.

FIG. 24 is a diagram illustrating an example of a processing flowchart of the communication rejection reception process S200. The relay device 200 performs the signature authentication process S100 in the communication rejection reception process S200. As a result of the signature authentication process S100, when the authentication of the signature of the received message is successful (Yes in S200-1), the relay device 200 updates the communication information management table (S200-2), transmits a communication rejection to the terminal device 100 of the transmission destination (S200-3), and ends the process.

In the process S200-3, the relay device 200 updates the transmission-side identifier corresponding to the reception-side identifier in which the identifier of the terminal device 100 that is the transmission source of the communication rejection is stored to "–", which means no transmission-side identifier. By updating the communication information management table as described above, the terminal device 100 that has transmitted the communication rejection is set to a state in which reception of the communication message from the terminal device 100 of the transmission destination is not permitted.

On the other hand, when the authentication fails (NO in step S200-1), the relay device 200 discards the communication rejection and ends the process.

Returning to the sequence of FIG. 21, in the communication rejection process S200, the relay device 200 performs the signature authentication process S100, transmits a signature verification request to the node 300-3 (S52, S100-1 in FIG. 12), receives a signature verification response from the node 300-3 (S51, S100-2 in FIG. 12), and authenticates the signature of the received communication rejection S54. The relay device 200 authenticates that the terminal device 100-1 is a valid terminal device 100 (S100-4 in FIG. 12), and determines that the authentication is successful (Yes in S200-1 in FIG. 24). The relay device 200 updates the communication information management table (S200-2 in FIG. 24), and transmits a communication rejection to the terminal device 100-2 of the transmission destination (S53, S200-3 in FIG. 24).

FIG. 25A to 25B are diagrams illustrating an example of a communication information management table. FIG. 25A illustrates an example of the communication information management table at the time of receiving the communication request S21. The relay device 200 updates the communication information management table from the state illustrated in FIG. 25A (the transmission-side identifier "def" corresponding to the reception-side identifier "abc") to the state of "–" as illustrated in FIG. 25B in which the transmission destination identifier "def" of the communication rejection is deleted as the transmission-side identifier corresponding to the reception-side identifier "abc". As a result, the terminal device 100-1 is set to a state in which a communication message from the terminal device 100-2 is not received, and is in a state in which messages are not permitted to be transmitted and received to and from each other.

<2. Processing at the Time of Receiving Communication Rejection During Communication>

FIG. 26 is a diagram illustrating an example of a sequence when the terminal device 100-1 transmits a communication rejection during communication. For example, the terminal device 100 may transmit a communication rejection when terminating communication.

The terminal device 100-1 transmits a communication rejection to the relay device 200 (S61). Upon receiving the communication rejection, the relay device 200 performs the communication rejection reception process S200.

In the communication rejection reception process S200, the relay device 200 performs the signature authentication process S100, transmits a signature verification request to the node 300-3 (S62, S100-1 in FIG. 12), receives a signature verification response from the node 300-3 (S63, S100-2 in FIG. 12), and authenticates the signature of the received communication rejection S61. The relay device 200 authenticates that the terminal device 100-1 is a valid terminal device 100 (S100-4 in FIG. 12), and determines that the authentication is successful (Yes in S200-1 in FIG. 24). The relay device 200 updates the communication information management table (S200-2 in FIG. 24), and transmits a communication rejection to the terminal device 100-2 of the transmission destination (S64, S200-3 in FIG. 24).

FIG. 27A to 27C are diagrams illustrating an example of a communication information management table. FIG. 27A is a diagram illustrating an example of a communication information management table during communication. The relay device 200 updates the communication information management table from the state illustrated in FIG. 27A (the transmission-side identifier "def" corresponding to the reception-side identifier "abc") to the state of "–" as illustrated in FIG. 27B, in which the transmission destination identifier "def" of the communication rejection is deleted as the transmission-side identifier corresponding to the reception-side identifier "abc". As a result, the terminal device 100-1 is in a state of not receiving the communication message from the terminal device 100-2.

Returning to the sequence of FIG. 26, upon receiving the communication rejection S64 from the terminal device 100-1, the terminal device 100-2 recognizes that the terminal device 100-1 has rejected reception of a subsequent communication message. The terminal device 100-2 transmits a communication rejection addressed to the terminal device 100-1 to the relay device 200 in order to notify that the own device also rejects reception of the communication message from the terminal device 100-1 (S65).

Upon receiving the communication rejection S65, the relay device 200 performs the communication rejection reception process S200. In the communication rejection reception process S200, the relay device 200 performs the signature authentication process S100, transmits a signature verification request to the node 300-3 (S66, S100-1 in FIG. 12), receives a signature verification response from the node 300-3 (S67, S100-2 in FIG. 12), and authenticates the signature of the received communication rejection S65. The relay device 200 authenticates that the terminal device 100-2 is a valid terminal device 100 (S100-4 in FIG. 12), and determines that the authentication is successful (Yes in S200-1 in FIG. 24). The relay device 200 updates the communication information management table (S200-2 in FIG. 24), and transmits a communication rejection to the terminal device 100-1 of the transmission destination (S68, S200-3 in FIG. 24).

The relay device 200 updates the communication information management table from the state illustrated in FIG. 27B (the transmission-side identifier "abc" corresponding to the reception-side identifier "def") to the state of "–" as illustrated in FIG. 27C, in which the transmission destination identifier "abc" of the communication rejection is deleted as the transmission-side identifier corresponding to the reception-side identifier "def". As a result, the terminal device 100-2 is set to a state in which the communication message from the terminal device 100-1 is not received. For example, the terminal devices 100-1 and 200-2 are in a communication rejection state in which the terminal devices 200-1 and 200-2 do not receive the communication message of each other.

In the second embodiment, by receiving the communication rejection, the relay device 200 updates the communication information management table and rejects transmission and reception of a communication message. When receiving the communication rejection from the terminal device 100-1, the relay device 200 sets a state in which transmission of the communication message to the terminal device 100-1 is rejected, but keeps a state in which transmission of the communication message to the terminal device 100-2 in the opposite direction is permitted. The relay device 200 receives the communication rejection from the terminal device 100-2, and sets a state in which transmission of the communication message to the terminal device 100-2 is rejected, thereby setting a state in which mutual communication is not possible. In the first embodiment, at the time of receiving a communication response, reception permission of the transmission source device is performed. Since signature authentication ensures validity of only the transmission source device and validity of the transmission destination device is not authenticated, the relay device 200 updates only the state of whether or not reception of the terminal device of the transmission source is permitted, thereby suppressing the update of the table by a communication rejection message from another terminal device (for example, a malicious third party).

Other Embodiments

The terminal devices 100 may use a common key only in mutual communication. The communication request message may include the common key. For example, the common key generated by the terminal device 100-1 is included in a communication request message transmitted when the terminal device 100-1 starts communication with the terminal device 100-2, and is transmitted to the terminal device 100-2. Accordingly, the terminal devices 100-1 and 100-2 may share the common key by using a message whose signature is authenticated by the relay device 200.

In the second embodiment, when the terminal device 100 receives the communication rejection message, the own device also transmits the communication rejection message to the partner device. However, for example, when one-way communication is allowed, the terminal device 100 may not return a communication rejection message corresponding to the received communication rejection message.

When there are three or more terminal devices 100, communication between three or more devices may be realized by the same processes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A relay device comprising:
a communication circuit configured to transmit and receive a message to and from any of the plurality of communication devices included in a communication system, the communication system further including a plurality of nodes, each of the plurality of nodes including a first processor circuit configured to perform distributed ledger processing that includes storing, for each of the plurality of communication devices, in a distributed ledger, an identifier of the each of plurality of communication devices and a public key used for communication by the each of the plurality of communication devices, and sharing the distributed ledger with each other nodes of the plurality of nodes, the communication circuit being coupled to at least a node being any one of the plurality of nodes; and a second processor circuit configured to execute authentication processing, the authentication process including in response to the communication circuit receiving a first message from a first communication device being the any of the plurality of communication devices, causing the communication circuit to transmit, to the node coupled to the communication circuit a request message for requesting a public key corresponding to a transmission source identifier of first communication device that is a transmission source of the received first message, the first message being a message addressed to a second communication device among the plurality of communication devices, the first message including a signature of the first communication device, the request message including the transmission source identifier of the first communication device;

in response to the transmitting of the request message, causing the communication circuit to receive, from the node, a response message including information indicating whether the public key corresponding to the transmission source identifier indicated in the request message has been detected in the distributed ledger stored in the node, the response message further including, in a case where the public key corresponding to the transmission source identifier indicated in the request message has been detected in the distributed ledger, the detected public key corresponding to the transmission source identifier indicated in the request message;

in response to the receiving of the response message including the detected public key, authenticating the signature included in the received first message with the public key included in the response message;

in a case where the authenticating of the signature of the first communication device is successful, transferring the first message from the first communication device to the second communication device;

in response to the receiving of the response message that does not include the public key corresponding to the transmission source identifier, refraining from the transferring of the first message from the first communication device to the second communication device; and in a case where the authenticating of the signature of the first communication device is not successful, refraining from the transferring of the first message from the first communication device to the second communication device.

2. The communication relay device according to claim 1, wherein the communicator receives from the first communication device a communication request message that requests the second communication device to permit communication, the communicator transmits to the second communication device the communication request message when the authentication is successful, the processor performs the authentication process when receiving a communication response message that is a response to the communication request message from the second communication device, and the communicator transmits to the first communication device the communication response message when the authentication is successful.

3. The communication relay device according to claim 2, further comprising:

a memory configured to store a communication management table that manages a reception permission state of whether or not the communication device permits reception of the communication message, wherein the processor updates to a state in which the first communication device permits reception of the communication message transmitted from the second communication device in the management table when the authentication is successful.

4. The communication relay device according to claim 3, wherein the communication response message includes permission information indicating whether or not to permit the communication, and the processor updates to a state in which the second communication device permits reception of the communication message transmitted from the first communication device in the management table when the authentication is successful and the permission information indicates permission of the communication.

5. The communication relay device according to claim 4, wherein the processor performs a rejection reception process of performing the authentication process when receiving a rejection message that is a message transmitted from the first communication device to the second communication device and that notifies that reception of the communication message transmitted from the second communication device is rejected, when the authentication is successful, updating the communication management table to a state in which the first communication device does not permit reception of the communication message transmitted from the second communication device, and the communicator transmits the rejection message to the second communication device when updating the communication management table to a state in which the first communication device does not permit reception of the communication message transmitted from the second communication device.

6. The communication relay device according to claim 2, wherein the communication request message includes a common key that is used for communication between the first communication device and the second communication device and that is not used for communication other than communication between the first communication device and the second communication device.

7. The communication relay device according to claim 1, further comprising:

a memory configured to store a control management table in which an identifier of the communication device is registered, wherein the processor performs a registration process of performing the authentication process upon receiving a registration request message that is a message transmitted when the communication device participates in the communication system and that includes an identifier of the communication device, and registering an identifier of the communication device in the control management table when the authentication is successful.

8. The communication relay device according to claim 7, wherein the control management table further stores a network address or a communication port or both to or from which the communication device transmits and receives a control message other than the communication message, and the registration request message includes the network address or the communication port or both; and in the registration process, the network address or the communication port or both are registered in the control management table when an identifier of the communication device is registered in the control management table.

9. The communication relay device according to claim 1, wherein the processor performs a discard process of discarding a received message, when authentication has failed in the authentication process.

10. A non-transitory computer-readable storage medium storing a program for causing a relay device to execute authentication processing, the relay device including: a communication circuit configured to transmit and receive a message to and from any of the plurality of communication devices included in a communication system, the communication system further including a plurality of nodes, each of the plurality of nodes including a first processor circuit configured to perform distributed ledger processing that includes storing, for each of the plurality of communication devices, in a distributed ledger, an identifier of the each of plurality of communication devices and a public key used for communication by the each of the plurality of communication devices, and sharing the distributed ledger with each other nodes of the plurality of nodes, the communication circuit being coupled to at least a node being any one of the plurality of nodes; and a second processor circuit configured to execute the authentication processing, the authentication processing comprising:

in response to the communication circuit receiving a first message from a first communication device being the any of the plurality of communication devices, causing the communication circuit to transmit, to the node coupled to the communication circuit a request message for requesting a public key corresponding to a transmission source identifier of first communication device that is a transmission source of the received first message, the first message being a message addressed to a second communication device among the plurality of communication devices, the first message including a signature of the first communication device, the request message including the transmission source identifier of the first communication device;

in response to the transmitting of the request message, causing the communication circuit to receive, from the node, a response message including information indicating whether the public key corresponding to the transmission source identifier indicated in the request message has been detected in the distributed ledger stored in the node, the response message further including, in a case where the public key corresponding to the transmission source identifier indicated in the request message has been detected in the distributed ledger, the detected public key corresponding to the transmission source identifier indicated in the request message;

in response to the receiving of the response message including the detected public key, authenticating the signature included in the received first message with the public key included in the response message;

in a case where the authenticating of the signature of the first communication device is successful, transferring the first message from the first communication device to the second communication device;

in response to the receiving of the response message that does not include the public key corresponding to the transmission source identifier, refraining from the transferring of the first message from the first communication device to the second communication device; and in a case where the authenticating of the signature of the first communication device is not successful, refraining from the transferring of the first message from the first communication device to the second communication device.

* * * * *